(12) United States Patent
Hurwitz

(10) Patent No.: US 7,814,917 B2
(45) Date of Patent: *Oct. 19, 2010

(54) ADD-ON HAIRBRUSH FOR PETS, PEOPLE AND LIVESTOCK THAT RELEASES ACTIVE INGREDIENTS

(75) Inventor: Marni Markell Hurwitz, Far Hills, NJ (US)

(73) Assignee: I Did It Inc., Far Hills, NJ (US)

( * ) Notice: Subject to any disclaimer, the term of this patent is extended or adjusted under 35 U.S.C. 154(b) by 704 days.

This patent is subject to a terminal disclaimer.

(21) Appl. No.: 11/788,666

(22) Filed: Apr. 20, 2007

(65) Prior Publication Data

US 2007/0193597 A1    Aug. 23, 2007

Related U.S. Application Data

(63) Continuation-in-part of application No. 11/710,829, filed on Feb. 26, 2007, which is a continuation-in-part of application No. 11/710,848, filed on Feb. 26, 2007, now Pat. No. 7,694,687, which is a continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
    *A45D 24/22* (2006.01)
(52) U.S. Cl. .................... 132/116; 132/112
(58) Field of Classification Search ......... 132/112–116, 132/120; 401/184, 183, 187; 119/118
    See application file for complete search history.

(56) References Cited

U.S. PATENT DOCUMENTS

| | | | | |
|---|---|---|---|---|
| 2,930,060 A | * | 3/1960 | Pearce | 401/184 |
| 4,244,076 A | | 1/1981 | Meyer | 15/188 |
| 5,150,491 A | | 9/1992 | Ikemoto | 15/1.52 |
| 5,261,426 A | | 11/1993 | Kellett et al. | 132/108 |
| 5,622,192 A | * | 4/1997 | Chiou | 132/112 |
| 5,626,099 A | | 5/1997 | Staller et al. | 119/625 |
| 5,762,433 A | * | 6/1998 | Cary | 401/184 |
| 5,927,290 A | * | 7/1999 | Thiruppathi | 132/116 |
| 6,450,127 B2 | | 9/2002 | Willinger et al. | 119/663 |
| 6,543,388 B2 | | 4/2003 | Willinger et al. | 119/663 |
| 6,575,174 B2 | | 6/2003 | Lee | 132/160 |
| 2008/0202544 A1 | * | 8/2008 | Hurwitz | 132/114 |

* cited by examiner

*Primary Examiner*—Robyn Doan
(74) *Attorney, Agent, or Firm*—Ernest D. Buff & Associates, LLC; Ernest D. Buff; Margaret A. LaCroix

(57) ABSTRACT

An add-on hairbrush for people, pets and livestock comprises a brush base with an internal cavity that includes a connection means. A vessel that houses a composition, liquid or powder, containing active ingredients is attached to the brush base. The composition containing active ingredients is transferred to the internal cavity of the brush base for release directly onto the hair during brushing. Delivery of the liquid/powder is activated during brushing through automatic deformation of a flexible deformable membrane or through manual depression of a deformable brush cover. The flexible deformable membrane includes bristle elements and delivery apertures or spray elements that carry and align with central spray apertures of spray elements for delivery of the composition containing active ingredients onto the hair. The vessel can act as a handle, and is a separate tube or container, that is preferably squeezable for transfer of the composition to the brush base.

46 Claims, 12 Drawing Sheets

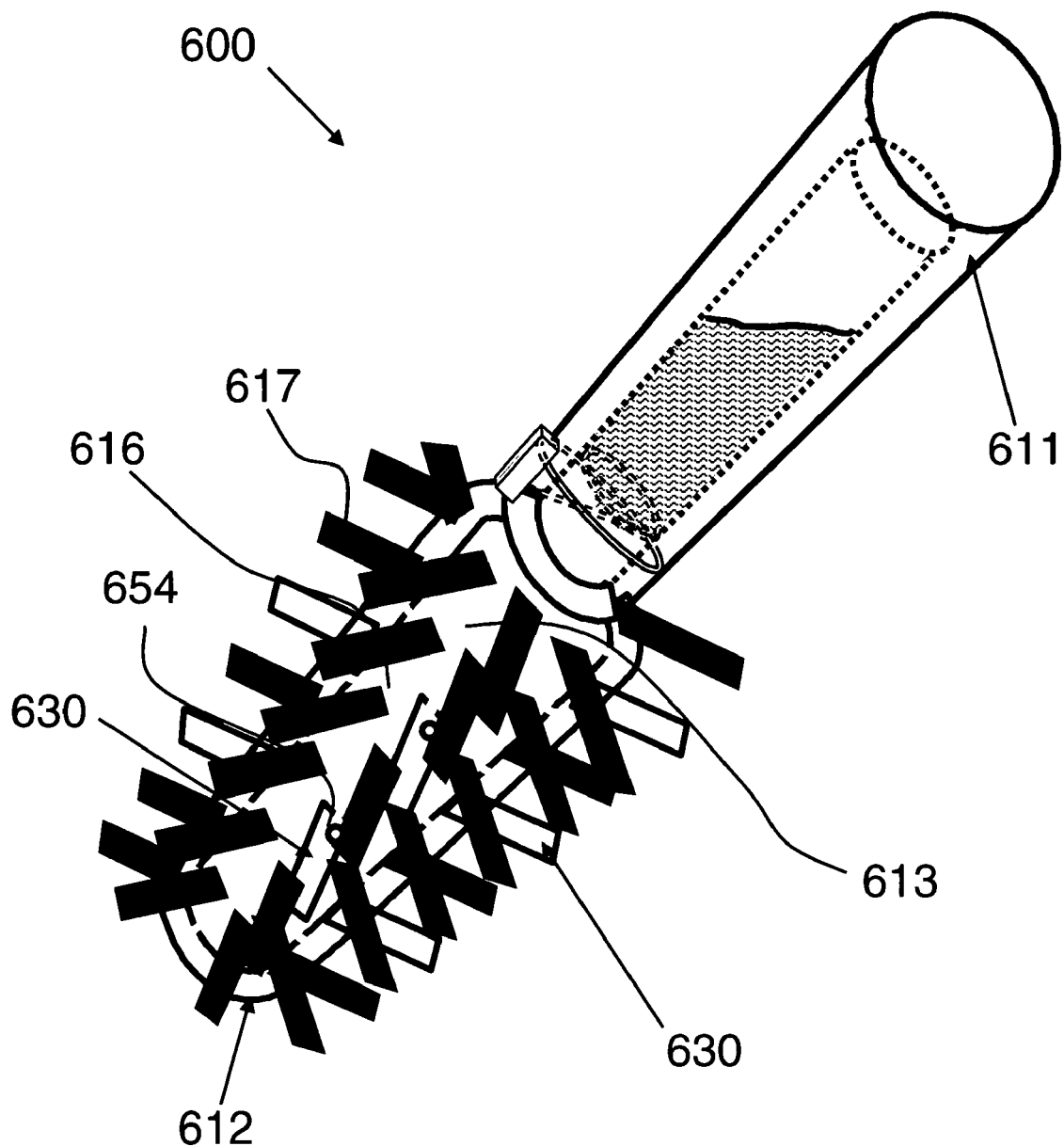

ADD-ON HAIRBRUSH FOR PETS, PEOPLE AND LIVESTOCK THAT RELEASES ACTIVE INGREDIENTS

This is a Continuation-In-Part of application Ser. No. 11/710,829, filed Feb. 26, 2007, for "Pneumatic Hairbrush For Pets And People That Releases Active Ingredients In Powder Form", which in turn is a Continuation-In-Part of application Ser. No. 11/710,848, filed Feb. 26, 2007, now U.S. Pat. No. 7,694,687 for "Direct Application Brush For Horses And Livestock That Releases Active Ingredients", which in turn is a Continuation-In-Part of application Ser. No. 11/349,638, filed Feb. 8, 2006, now U.S. Pat. No. 7,322,364 for "Hairbrush for Pets and People that Releases Active Ingredients", which in turn is a Continuation-In-Part of application Ser. No. 11/186,583, filed Jul. 21, 2005, now U.S. Pat. No. 7,337,784 for "Hairbrush for Pets and People that Releases Active Ingredients", the disclosure of which is hereby incorporated in its entirety by reference thereto.

BACKGROUND OF THE INVENTION

1. Field of the Invention

The present invention relates to an add-on hairbrush for pets, people and livestock; and more specifically to a brush base including bristles and at least one spray element which is appointed to removably receive a handle constructed as a container housing active ingredients, such as fragrance, therapeutic or moisturizing compounds, antibacterial compounds, insect repellant, hair shampoo, medicaments, and conditioning products, dye compositions or other hair-related products, which, during brushing, are released through the spay head and disseminated throughout the hair being brushed.

2. Description of the Prior Art

Many patents address issues related to hairbrush designs having a number of bristles adapted to provide desired brushing action. Brushes for pets typically incorporate harsh bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush, especially a hairbrush. The method involves attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear ends, together with the webs, are cast in the material of the bristle support, so that the bristle pin rows are embedded in the bristle support. In this method, the bristle pins are molded into a cast support that is rigid and solid and therefore is incapable of delivering perfume or other active compositions to the hair being brushed.

U.S. Pat. No. 5,150,491 to Ikemoto discloses a hairbrush. A hairbrush is adapted to prevent static charging of the bristles and hair. It has a multiplicity of small holes formed in a conductive brush base that carries a row of antistatic members. The antistatic members are relatively stiff. They are prevented from bending down, and render the brush easy to draw through hair, thereby facilitating smooth brushing. The conductive brush base is solid. It cannot deliver perfume or other active compositions to hair, but merely eliminates the static present in the hair and bristles by conducting charges that are present.

U.S. Pat. No. 5,261,426 to Kellett, et al. discloses a hydrophilic foam pad for hair styling. The hair conditioning and styling pad is a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair; moreover, the brush is not constructed as an independent brush base appointed to receive a handle containing active ingredients.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips, each having magnetic properties, or a single magnetic sheet. Each strip has its magnetic poles aligned uniformly so that its longitudinal ends are polar opposites. This therapeutic groomer does not deliver perfume or active compositions to the hair being groomed. Additionally, the brush is not constructed as an independent brush base appointed to receive a handle containing active ingredients.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a hairbrush that delivers perfumes or other active ingredients to brushed hair. Moreover, these patents do not provide a brush construction including an independent brush base appointed to receive a handle containing active ingredients.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries nail heads, which rests against and are glued to a thick rubber element using rubber cement or similar glue. The bristle pins in the rubber element form an air leak-tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied, thereby providing a springy feel, while the entrapped air is released through the single hole present in the elliptical rubber element. This brush has a single air outlet and discharges air entrapped in the elliptical cavity of the brush. It has no means available for delivering a perfume or other active ingredients to the brushed hair; moreover, the brush is not constructed as an independent brush base appointed to receive a handle containing active ingredients.

U.S. Pat. No. 6,575,174 to Lee discloses a hair grooming brush. This hair grooming brush has a plurality of rows of curved wavy bristles, rather than traditional straight bristles commonly found on brushes and combs. The curvature of the bristles produces springiness to the bristles when pressure is applied during the combing action. The springiness of the numerous rows of bristles translates into a massaging effect upon the hair and scalp. These springy bristles do not deliver perfumes or other active compositions to the hair being brushed.

There remains a need in the art for an easy to use hairbrush for grooming hair of humans, pets or livestock that is constructed with a brush base appointed to receive a mating container that acts as a handle. Moreover, there remains a need in the art for a hairbrush that delivers one or more active ingredients, such as perfume or other active compositions directly to the hair. Also needed is a hairbrush that releases shampoos, conditioners, medicaments, perfume or other active compositions continuously during brushing, and releases these active compositions on demand.

SUMMARY OF THE INVENTION

The present invention discloses a lightweight add-on hairbrush that comprises a brush base constructed with an end having a connection means integrated with a base aperture and a pathway leading into an internal cavity. The internal cavity includes a bottom surface having a first opening and a top surface having a second opening. A cover is attached to the second opening. The first cavity opening is located on the bottom surface of the brush base, facing the bristles of the brush. The second cavity opening is located on the top surface of the brush base, opposed to the bristles. A flexible, deformable membrane having a plurality of bristle apertures, preferably made from rubber, carries a multitude of bristle elements inserted through the apertures in the flexible deformable membrane. The flexible deformable membrane further includes at least one delivery aperture that is mated with a central spray aperture of a spray element. At least one spray element, and preferably a plurality of spray elements, are provided; most preferably three spray elements are provided. Preferably, the spray elements each comprise an elongated hollow conical shaft appointed with the central spray aperture, a head portion, and at least one spray orifice. The delivery aperture of the flexible deformable membrane is aligned with the central spray aperture of the spray element so that a continuous liquid or solid powder delivery path is provided through the elongated hollow conical shaft into the head portion. Release of the liquid/solid powder is achieved through the spray orifice, and delivery to the hair results. The edges of the flexible deformable membrane are tightly fitted to or permanently bonded to the walls of the first opening of the internal cavity, thereby forming a leak tight seal. The second cavity opening is fitted with a back cover, arranged so that it can be manually pushed in and out.

In another embodiment, geared particularly to the delivery of a solid or powder composition containing active ingredients, the invention discloses a lightweight brush comprising a brush base constructed with an internal cavity having a cavity area and a bottom surface having a first opening and top surface having a second opening, respectively. The first cavity opening is located on the bottom surface of the brush base, facing the bristles of the brush. The second cavity opening is located on the top surface of the brush base, opposed to the bristles. A flexible, deformable membrane, preferably made from rubber, carries a multitude of bristles, and covers and tightly fits within the first opening of the internal cavity. The flexible, deformable membrane has a number of holes or apertures positioned between the bristles so that powder exits the internal cavity from these holes or apertures and migrates along the exterior of the local bristles to be delivered to the hair. The second cavity opening is fitted with a back cover, arranged so that it can be manually pushed or compressed inward and flexes back outward.

The powder mixture contains a desired perfume or fragrance and/or other active compositions such as insect repellants, hair shampoo, hair conditioning products, dye compositions, moisturizing ingredients, antibacterial compounds, and the like. When hair is brushed with the brush of the subject invention, the flexible membrane is deformed, causing the area of the internal cavity to lessen as the internal cavity is compressed. Compression of the internal cavity and air pressure causes the powder mixture to travel into the plurality of apertures of the deformable membrane and enter the bristles for delivery and release of the powder mixture and visa vie the fragrance or perfume and/or other active compositions, to the hair being brushed.

Alternatively, the back cover which is positioned over the second opening may be manually pushed inwards towards the bristles, thereby squeezing the internal cavity and pneumatically releasing the powdered mixture containing fragrance, or perfume and/or other active compositions through the apertures in the flexible deformable member. This method of releasing the fragrance and/or active compositions does not require the bristles to be in contact with the hair being brushed, and can therefore be used to treat selected areas of hair prior to vigorous brushing.

A vessel for housing compositions containing active ingredients is appointed to be attached to the brush base. The vessel includes a chamber and an opening with a mating portion appointed for engagement with the connection means of the end of the brush base for attachment of the vessel to the brush base. Liquid/powder is transferred from the vessel through the pathway of the brush base into the internal cavity for release through the spray elements during brushing. Transference of the liquid/powder from the vessel is preferably controlled and achieved by a control button integrated within the back cover. The control button acts in conjunction with a flow valve, wherein when the button is switched in an activated or on position, the valve is opened and liquid/powder is allowed to flow through the pathway into the internal cavity of the brush base. Conversely, when the button is moved to a deactivated position or off position, the valve is closed and liquid/powder is prevented from flowing through the pathway and is retained within the vessel.

Once the desired amount of liquid/powder has been transferred from the vessel into the internal cavity of the brush base, the add-on brush is ready for use and delivery of the liquid/powder to the hair. When hair is brushed with the brush of the subject invention, the flexible membrane is deformed. This causes the internal cavity to be squeezed, and the liquid gel/powder fragrance or perfume or other active composition is released to the hair being brushed through the fine delivery apertures traversing the central spray apertures provided within the spray elements transferring the liquid gel/powder shampoo, conditioner, perfume, fragrance or active ingredient to hair during brushing. Application of additional pressure on the bristles during brushing instantly releases the liquid gel/powder perfume, fragrance or active ingredient due to the depression of the area of the internal cavity, thereby forcing the liquid/powder to enter the delivery apertures of the flexible deformable membrane and central spray apertures of the spray elements to be released through the spray orifices thereof.

Alternatively, the back cover, which is positioned over the second opening, may be manually pushed inwards towards the bristles, thereby squeezing the internal cavity and releasing the fragrance, or perfume and/or other active compositions through the delivery apertures of the flexible deformable membrane and central spray apertures of the spray elements to be released through the spray orifices. This method of releasing the liquid gel/powder perfume, fragrance and/or active compositions does not require the bristles to be in contact with the hair being brushed, and can therefore be used to treat selected areas of hair prior to vigorous brushing.

The bristles may be attached to the flexible deformable membrane in numerous ways. The bristles may be molded together by injection molding or similar processes with the deformable membrane. The spray elements may also be attached to the flexible deformable membrane numerous ways, including injection molding or the like. Both the bristles and the spray elements may be constructed with the flexible deformable membrane as a unitary body with the delivery apertures in the flexible deformable membrane matching the central spray apertures of the spray elements. In a second embodiment, the spray elements may comprise elongated apertures that are U shaped and traverse the length of the elongated hollow conical shaft so that the aperture not only brings the liquid gel perfume, fragrance or active agent to the tip of the spray element, but also delivers along the length of the spray element body. In this embodiment, the spray elements deliver the liquid gel perfume, fragrance or active ingredient along their entire conical shaft length and any hair contacting the conical shaft is coated with the liquid gel of fragrance, perfume or active ingredient. In another embodiment, particularly where the powder is used, the flexible membrane includes apertures spaced in-between the bristles so that the powder travels through the apertures onto the hair, while also traveling along the exterior of neighboring bristles for optimum delivery.

Alternatively, the flexible deformable membrane is provided as an insertable or interchangeable flexible deformable membrane so that different inserts can be provided. With one of the inserts having at least one spray element comprising an elongated hollow conical shaft with a central spray aperture, a head portion, and at least one spray orifice, and wherein the head portion further comprises a head top, head bottom, and at least one side wall, and the at least one spray orifice is located within the side wall to provide lateral delivery of the liquid, generally for delivery of a liquid composition with active ingredients. Another insertable flexible deformable membrane is provided having spray elements comprising bristle apertures that align with bristle apertures of the flexible deformable membrane for delivery of the liquid. This particular insert may further be provided with supplemental spray elements constructed with the elongated hollow conical shaft with a central spray aperture, a head portion, and at least one spray orifice as well as the bristle elements including. Still another insert of the flexible deformable membrane may be provided with spray elements constructed as a plurality of apertures located in-between the bristles of the interchangeable flexible deformable membrane, for delivery of a solid or dry powdered composition with active ingredient. In all instances, at least one spray element is integrated within the flexible deformable membrane. A vessel housing a liquid containing active ingredients is appointed to be added-onto the brush base, this vessel may be a flexible container, bottle or handle shaped, or tubular, and is preferably appointed to be squeezed so that the contents of the container are transferred to the internal cavity of the brush base.

The brush is assembled first by inserting the flexible, deformable membrane with bristle elements and spray elements having fine central spray apertures attached thereto into the first opening of the internal cavity of the brush base. The deformable membrane is entirely contained within the first opening, wherein the perimeter of the membrane rests against the inner wall which is defined by the internal cavity. As the liquid/powder is released from the spray elements and becomes exhausted from the internal cavity, additional liquid/powder can be delivered into the internal cavity from the vessel attached to the brush base. Upon exhaustion of the liquid/powder from the vessel, the vessel may either be replaced by a new vessel, or refilled for repeat usage. The vessel is replaced by disengaging the mating portion of the vessel from the connection means of the brush base, and attaching a new vessel onto the connection means of the brush base.

The liquid/powder containing active ingredients includes perfume and/or other active compositions including insect repellant, shampoo, hair-conditioning products, dye compositions, moisturizing ingredients, antibacterial compounds, and the like is marketed as a replacement product. The chamber of the vessel is sealed, and is preferably composed of a polymeric material, and the user opens the chamber of the vessel by removing the vessel lid and engaging the mating portion of the vessel with the connection means of the brush base and activates the control button (optional) located on the cover of the brush base to transfer a portion of the liquid into the internal cavity of the hairbrush of the subject invention. Under normal use a vessel lasts until the liquid/powder housed therein is exhausted.

The bristles display a springy action due to the flexible deformable membrane, which traps air within the internal cavity. The liquid/powder itself transferred to the internal cavity also acts as a resilient member providing a cushioning action. Pushing the back cover in to release the liquid gel/powder fragrance, perfume and/or other active composition is resisted by the flexible deformable membrane.

The liquid gel perfume, fragrance or active ingredient has a contact angle sufficiently low, typically in the range of 1 to 30 degrees with respect to the bristle material so that the liquid penetrates the fine apertures provided within the bristles. If the contact angle is significantly larger, the penetration of the liquid gel within the fine apertures of the bristle is compromised.

Significant advantages are realized by practice of the present invention. The key features of the pneumatic pet/people brush include, in combination, the features set forth below:

1) a brush base having an end having a connection means integrated with a base aperture and a pathway leading into an internal cavity within the brush base, the internal cavity having a bottom surface with a first opening and top surface having a second opening, respectively;

2) the first opening is appointed to receive a flexible deformable membrane;

3) the second opening is appointed to receive a back cover;

4) the flexible deformable membrane has several rows of bristle elements and at least one fine delivery aperture provided therewithin;

5) at least one spray element having a central spray aperture being aligned with the delivery aperture and integrated within the flexible deformable membrane;

6) a vessel housing a liquid gel/powder perfume, fragrance and/or other active compositions including insect repellants, shampoo, hair-conditioning products, dye compositions, moisturizing ingredients, antibacterial compounds, and the like, is removably attached to the brush base;

7) liquid/powder from the vessel is transferred into the internal cavity of the brush base;

8) brushing action deforms the flexible deformable membrane, thereby squeezing the internal cavity and releasing to the brushed hair the liquid gel/powder perfume, fragrance and/or other active compositions contained within the internal cavity, releasing the liquid through the fine delivery apertures that are open and releasing the liquid into the central spray aperture of the spray element and being delivered to the hair through spray apertures, and optionally additionally open along the length of the elongated hollow conical shaft of the spray element;

9) a user, at any time, may manually depress the back cover to squeeze the internal cavity, causing pressure that results in release of the liquid/powder perfume, fragrance and/or other active compositions through the delivery apertures in the bristles of the flexible deformable membrane to the central spray apertures of the elongated hollow conical shaft of the spray element; and 10) the user may periodically refill/replace the vessel with a fresh liquid or powder vessel when the liquid containing active ingredients is exhausted;

whereby the user of the hairbrush of the subject invention is provided with the capability to saturate the hair being brushed with a perfume, fragrance and/or other active compositions including insect repellant, hair shampoo and conditioning products, dye compositions, moisturizing ingredients, antibacterial compounds, and the like.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 5b is a top view of the removable handle of the embodiment of the hairbrush shown in FIG. 5a;

FIG. 7 is another embodiment of the hairbrush of the subject invention, showing a round shaft brush base with a vessel holding active ingredients there attached for delivery of the active ingredients into the internal cavity of the brush base and into the spray elements for ultimate delivery to hair during brushing;

DETAILED DESCRIPTION OF THE INVENTION

Figure 1A:
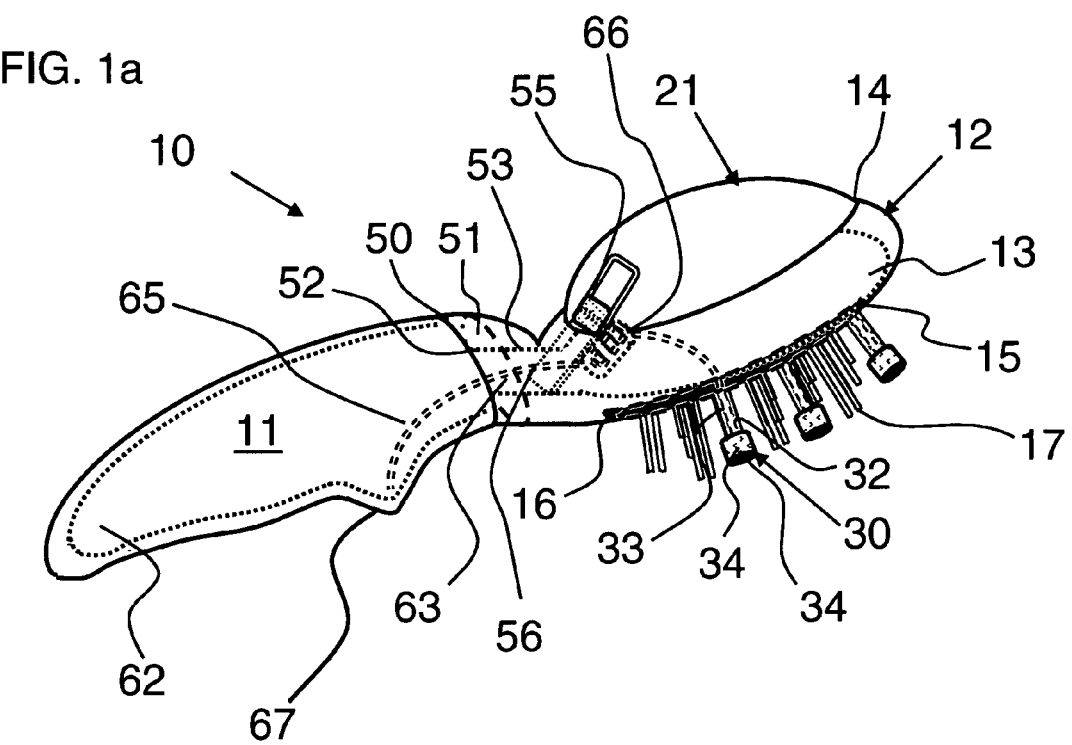
FIG. 1a is an illustration depicting the assembled hairbrush of this invention, showing the brush base, the internal cavity, the flexible deformable membrane having brush elements, spray elements with a central spray aperture, and the back cover removably attached to a vessel holding liquid containing active ingredients and acting as a handle, wherein a portion of liquid containing active ingredients has been transferred to the internal cavity for use while a remaining portion of the liquid is retained within the vessel.

This invention relates to a hairbrush for use with pets, such as dogs, cats, ferrets and the like, humans and livestock, such as horses, ponies, llamas, cattle and the like, providing a brush base that is appointed with an add-on comprising a vessel which contains a liquid composed of active ingredients for hair care. Spray elements located within the brush base of the hairbrush of the subject invention release a liquid gel/powder fragrance, perfume and/or other active compositions including insect repellent compositions, hair shampoos and conditioner, grooming products or dye compositions, moisturizing ingredients, antibacterial compounds, or the like.

The hairbrush is provided with a brush base that has an internal cavity with a bottom surface having a first opening and top surface having a second opening, respectively. The first opening receives a flexible deformable membrane which carries bristle elements. Additionally, the flexible deformable membrane is constructed with delivery apertures aligned with central spray apertures located within spray elements. The flexible deformable membrane is provided with at least one delivery aperture for alignment with at least one central spray aperture of at least one spray element. Preferably there is provided a plurality of spray elements and visa vie a plurality of delivery apertures and corresponding central spray apertures; most preferably, there is provided three spray elements and visa vie three delivery apertures and corresponding central spray apertures. The central spray apertures release liquid/powder containing active ingredients into the head portion of the spray element and release the liquid/powder into the hair by way of spray orifices during brushing or at the desire of the user at any time. The flexible deformable membrane has a plurality of delivery apertures within which the elongated hollow conical shaft having central spray apertures of the spray elements are placed providing a continuous liquid gel/powder flow path. The first opening receives the flexible deformable membrane with the bristles and spray element bodies extending from the brush base, wherein the perimeter of the flexible deformable membrane rests against the interior wall defined by the internal cavity, thereby forming a leak tight seal. Preferably, the flexible deformable membrane is permanently bonded to the walls of the first opening in the bush base. A back cover is attached over the second opening to form a leak tight seal for the internal cavity.

A vessel for housing liquid/powder containing active ingredients is appointed to be added-on or attached to the brush base. The vessel includes a chamber and an opening with a mating portion appointed for engagement with the connection means of the end of the brush base for attachment of the vessel to the brush base. Liquid/powder is transferred from the vessel through the pathway of the brush base into the internal cavity for release through the spray elements during brushing. Transference of the liquid/powder from the vessel is preferably controlled and achieved by a control button that is integrated within the back cover, but may, optionally, be located near the end of the brush base. The control button acts in conjunction with a flow valve. When the button is switched in an activated or on position, the valve is opened and liquid is allowed to flow through the pathway into the internal cavity of the brush base. Conversely, when the button is moved to a deactivated position or off position, the valve is closed. Liquid/powder is prevented from flowing through the pathway, and is retained within the vessel.

Generally stated, the invention consists of a brush base which is appointed to be attached to a vessel or container housing a liquid/powder shampoo, conditioner, or other hair care product in order to assemble a hairbrush, which releases the liquid/powder during brushing or at any time by the user pressing the back cover. During the brushing action the bristles apply pressure against the central portion of the flexible deformable membrane, flattening the membrane configuration. This flattening action directly applies pressure on the internal cavity. The pressure, in turn, triggers release of a stream of the liquid contained therewithin. Liquid released from the internal cavity flows through the delivery apertures in the flexible deformable membrane and the central spray apertures within the elongated hollow conical shaft of the spray elements. Alternatively, the liquid gel fragrance, perfume and/or other active compositions may be released at will by manually depressing the back cover, which squeezes the internal cavity and causes a liquid stream to be released from the spray orifice of the head portion of the spray elements.

In another embodiment, geared particularly to the delivery of a solid or powder composition containing active ingredients, the invention discloses a lightweight brush comprising a brush base constructed with an internal cavity having a cavity area and a bottom surface having a first opening and top surface having a second opening, respectively. The first cavity opening is located on the bottom surface of the brush base, facing the bristles of the brush. The second cavity opening is located on the top surface of the brush base, opposed to the bristles. A flexible, deformable membrane, preferably made from rubber, carries a multitude of bristles, and covers and tightly fits within the first opening of the internal cavity. The flexible, deformable membrane has a number of holes or apertures positioned between the bristles so that powder exits the internal cavity from these holes or apertures and migrate along the exterior of the local bristles to be delivered to the hair. The second cavity opening is fitted with a back cover, arranged so that it can be manually pushed or compressed inward and flexes back outward.

The powder mixture contains a desired perfume or fragrance and/or other active compositions such as insect repellants, hair shampoo, hair conditioning products, dye compositions, moisturizing ingredients, antibacterial compounds, and the like. When hair is brushed with the brush of the subject invention, the flexible membrane is deformed, causing the area of the internal cavity to lessen as the internal cavity is compressed. Compression of the internal cavity and air pressure causes the powder mixture to travel into the plurality of apertures of the deformable membrane and enter the bristles for delivery and release of the powder mixture and visa vie the fragrance or perfume and/or other active compositions, to the hair being brushed. Alternatively, the back cover which is positioned over the second opening may be manually pushed inwards towards the bristles, thereby squeezing the internal cavity and pneumatically releasing the powdered mixture containing fragrance, or perfume and/or other active compositions through the apertures in the flexible deformable member. This method of releasing the fragrance and/or active compositions does not require the bristles to be in contact with the hair being brushed, and can therefore be used to treat selected areas of hair prior to vigorous brushing.

The first opening may take any shape including elliptical, circular, rectangular, or square-shaped. The second opening may take any shape including elliptical, circular, rectangular, or square-shaped. The flexible, deformable membrane may take any shape including elliptical, circular, rectangular, or square-shaped. The back cover may take any shape including elliptical, circular, rectangular, or square-shaped. Any other suitable geometric shapes are within the scope of the present invention. Preferably, each of the first opening, second opening, flexible membrane, and back cover has the same general shape, respectively. At a minimum, all that is required is that, whatever its shape, the flexible deformable membrane and the cover form an air tight seal with the internal cavity so that the liquid containing perfume, fragrance and/or other active composition is released reliably.

The flexible deformable membrane is preferably made from rubber typically with a thickness of $1/32$ inch to $3/32$ inch. The bristle apertures provided for receiving the bristles are typically 0.010-0.60 inches matching the outer diameter of the bristles used. The bristles are preferably polymeric bodies with a rounded end contacting hair. The bristles have a diameter ranging from 0.010 inch to 0.060 inches. The bristles are preferably permanently bonded to the flexible deformable membrane bristle apertures using glue or other attachment means. Additionally, the flexible deformable membrane includes delivery apertures for receiving the spray element's elongated hollow conical shaft having a central spray aperture, with the central spray aperture in the elongated hollow conical shaft matching the delivery aperture in the flexible deformable membrane so that a continuous liquid flow path is provided. Alternatively, the flexible deformable membrane, the bristle elements, and the spray elements with the central spray aperture may be molded by an injection molding processes in one step to create a single piece that contains the flexible deformable membrane, the bristles, and spray elements with the central spray aperture.

In another embodiment of the invention, each elongated hollow conical shaft of the spray elements has a central spray aperture, and a slit aperture along the length of the elongated hollow conical shaft. In other words, the elongated hollow conical shaft has a U shaped cross section and fits into or is bonded to the delivery aperture in the flexible deformable membrane. With this arrangement, the liquid contained in the internal cavity is delivered to the hair that is being brushed both along the length of the elongated hollow conical shaft and the spray element orifices, providing more uniform distribution of the liquid.

Since the liquid is released from the internal cavity and has to travel along the length of the elongated hollow conical shaft through the central spray aperture, it is important that the contact angle of the liquid with the elongated hollow conical shaft is in the range of 2 degrees to 30 degrees. If the contact angle exceeds this range, the liquid gel may not easily penetrate the central spray aperture and be delivered to the tip of the spray element in the first embodiment or to the tip and side surface of the spray element in the other embodiment.

Assembly of the hairbrush of this invention comprises the steps of:

1. Arranging a flexible deformable membrane with at least one delivery aperture adapted to receive and be attached to an elongated hollow conical shaft with central spray apertures of a spray element. The flexible deformable membrane is inserted through the first opening in the internal cavity of the brush base. Since the flexible deformable membrane has a slightly larger dimension than the first opening in the brush base, it must be flexed to insert the flexible deformable membrane. At this stage, the bristles and spray head (at least one) incorporated in the flexible deformable membrane point away from the internal cavity of the brush base. The perimeter of the flexible deformable membrane rests against the interior walls defined by the internal cavity, thereby forming an airtight seal. Alternatively, the flexible deformable membrane with attached bristles and spray element comprising the elongated hollow conical shaft having a central spray aperture may be permanently bonded to the brush base.

2. The vessel for housing liquid/powder containing active ingredients is attached to the brush base. The vessel's mating portion is engaged with the connection means of the end of the brush base for attachment of the vessel to the brush base. Liquid/powder is transferred from the vessel through the pathway of the brush base into the internal cavity for release through the spray elements during brushing. Transference of the liquid/powder from the vessel is preferably controlled and achieved by the control button integrated within the back cover.

3. Now the assembled brush is ready to use. It delivers liquid/powder perfume, fragrance and/or other active compositions when the hairbrush is used to brush hair of humans, pets or livestock. Alternatively, the liquid gel/powder fragrance, perfume and/or other active composition may be released at will by manually depressing the deformable back cover. Once the liquid/powder containing perfume, fragrance and/or active composition is exhausted, the vessel is either refilled or replaced with a fresh vessel by removing the emptied vessel from the brush base, refilling or replacing same, and reattaching the refilled vessel or fresh vessel to the brush base for transference to the internal cavity of the brush base.

FIG. 1 illustrates at 10 the add-on hairbrush of the subject invention with a vessel 11 removably attached to the brush base 12 with an internal cavity 13. The internal cavity 13 has a first opening generally marked 15 and a second opening generally marked 14. A flexible deformable membrane 16 with bristle elements 17 is provided. Flexible deformable membrane 16 further includes delivery apertures 22 appointed for receiving elongated hollow conical shafts 31 of spray elements 30. Spray element 30 comprises elongated hollow conical shaft 31 with a central spray aperture 32, a head portion 33, and at least one spray orifice 34. Flexible deformable membrane 16 is inserted within the first elliptical opening 15. The spray elements 30 are shown in cross section, for clarity, to illustrate the central spray aperture 32 within the elongated hollow conical shaft 31 thereof. The corresponding delivery apertures in the flexible deformable membrane 16 are shown at 22. Internal cavity 13 is appointed to receive liquid containing active composition therein above the flexible deformable membrane 16. The second opening 14 has a back cover 21 thereon attached. Preferably, back cover 21 further comprises a control button 55 that acts in conjunction with a flow valve 56 to allow liquid from vessel 11 to enter pathway 53 to internal cavity 13 and become transferred and housed within internal cavity 13 of brush base 12. Optionally the control button 55 may be located near the end of the brush base instead of on back cover 21. Flow valve 56 may operate as a spring valve, springing open when control button 55 is activated, and closing when control button 55 is disengaged. Alternatively, flow valve 56 may be connected directly to control button 55 so that the valve slides upward when the control button 55 is pushed upward, thereby opening pathway 53 for liquid transfer to internal cavity 13; in turn, when control button 55 is moved downward, flow valve 56 moves downward to close pathway 53 and prevent liquid passage from vessel 11. Alternatively, the hairbrush cover further comprises a pump lever operating in conjunction with a thin tube 65 that connects directly to a spray nozzle 66 having a spring and pump configuration connected to the spray element 30 so that the liquid is pumped through the tube into the spray nozzle 66 and delivered by ejection therefrom into the spray element 30 and is sprayed into the hair. Thin tube 65 preferably rests in a reservoir 67 located in vessel 11 so that the liquid collects or pools in the reservoir 67 and tube 65 has easy access to the liquid for delivery. In this manner, the composition is delivered to the hair as a spray. The hairbrush may further include a knob connected by a lanyard or rope to a cap adapted to fit over the spray element/elements. When the brush is in use, the cap is removed from the spray nozzle head/spray element and placed on the knob. If it falls off the knob, or is taken off the knob or spray element, it is still secured thereto the brush by way of the lanyard, thereby preventing it from becoming lost. The cap protects the spray nozzle or spray elements orifices when the brush is not in use, and also prevents liquid or powder from leaking through the spray nozzle or spray element.

Brush base 12 includes an end 50 having a connection means 51 integrated with a base aperture 52 and a pathway 53 leading into internal cavity 13 within brush base 12. A vessel 11 for housing a liquid containing active ingredients is provided comprising a chamber 62 and an opening with a mating portion 63. Mating portion 63 is appointed for engagement with connection means 51 of end 50 of brush base 12 for attachment of vessel 11 to brush base 12. Connection means 51 preferably comprises base threads and mating portion 63 preferably comprises vessel threads that engage with the base threads of the connection means 51 in a screw type configuration to removably attach vessel 11 to brush base 12. Preferably, connection means 51 comprises a female connector member and mating portion 63 comprises a male connector member so that the female connector member of connection means 51 receives the male connector member of mating portion 63. This can be accomplished in a number of ways, including via screw type configurations, as well as snap configurations involving tongue and groove type fasteners.

Figure 1B:
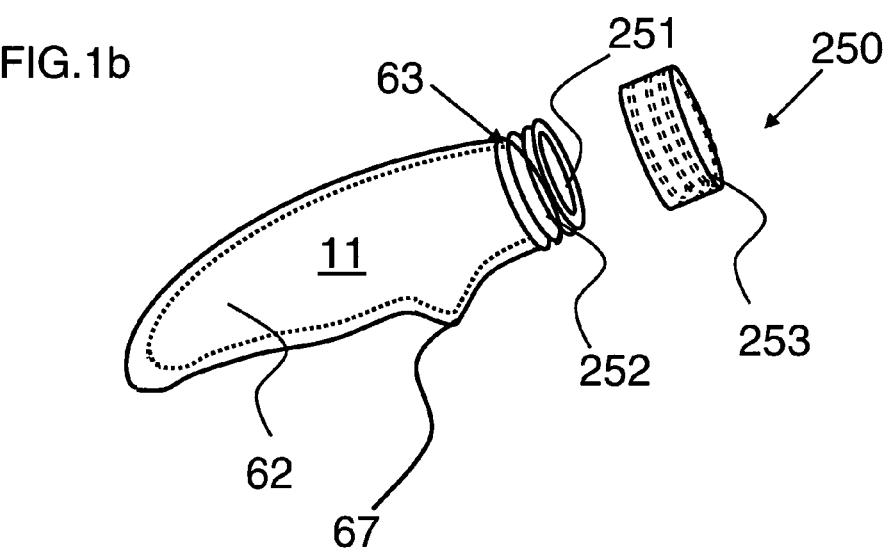
FIG. 1b is an illustration of the vessel holding active ingredients of FIG. 1a separated from the brush base and presented with a vessel lid.

Vessel 11 is constructed as a tube, bottle, or otherwise elongated structure, and is removable from brush base 12. FIG. 1b is an illustration of the vessel 11 separated from the brush base 12, shown generally at 250. In this embodiment, vessel 11 is constructed as a removable handle portion. Vessel 11 comprises a chamber 62 and an opening 251 with a mating portion 63 herein appointed with the vessel threads, shown at 252 for engagement with base threads of connection means 51 of end 50 of brush base 12 for attachment of vessel 11 to brush base 12. A vessel cap 253 is provided for storage of the liquid when vessel 11 is not attached to brush base 12. Vessel 11 is preferably flexible, so that it can be squeezed to deliver the composition containing active ingredients into the internal cavity of the brush base. Vessel 11 may be provided as a disposable container and replacement vessels 11 housing liquid containing active ingredients may be provided on the market for replacement of the exhausted disposed vessels 11. Preferably, vessel 11 is removable from brush base 12. However, in another embodiment, vessel 11 is attached to brush base 12 and is provided with an opening having a lid so that the vessel 11 can be refilled when necessary. Alternatively, the vessel for housing the liquid containing active ingredients may be constructed as a container having a hose that is appointed with a mating portion to be attached to the connection means of the brush base 12, such as for housing/delivery of larger amounts of the liquid, as in commercial operations. Still further, the vessel for housing the liquid may be replaced in its entirety with a hose having a mating portion appointed for attachment to the connection means of the brush base 12, for delivery of a continuous supply of fluid. This embodiment is particularly well suited for grooming operations on larger animals, such as horses, ponies, llamas, cattle and the like.

Preferably, the liquid is a shampoo, conditioner, or medicament treatment for the hair or scalp (or fur or coat). The liquid consists of active ingredients selected from a group consisting of insect repellants, flea and/or tick compounds, therapeutic or moisturizing compounds, or antibacterial compounds. Alternatively, the liquid consists of active ingredients selected from a group consisting of perfumes, fragrance, hair-conditioning and detangle products, shampoos, medicaments, hair sprays, gels, mousse products, sun protection lotions, dye compositions, fragrances or other hair/fur/coat-care related products.

Figure 2A:
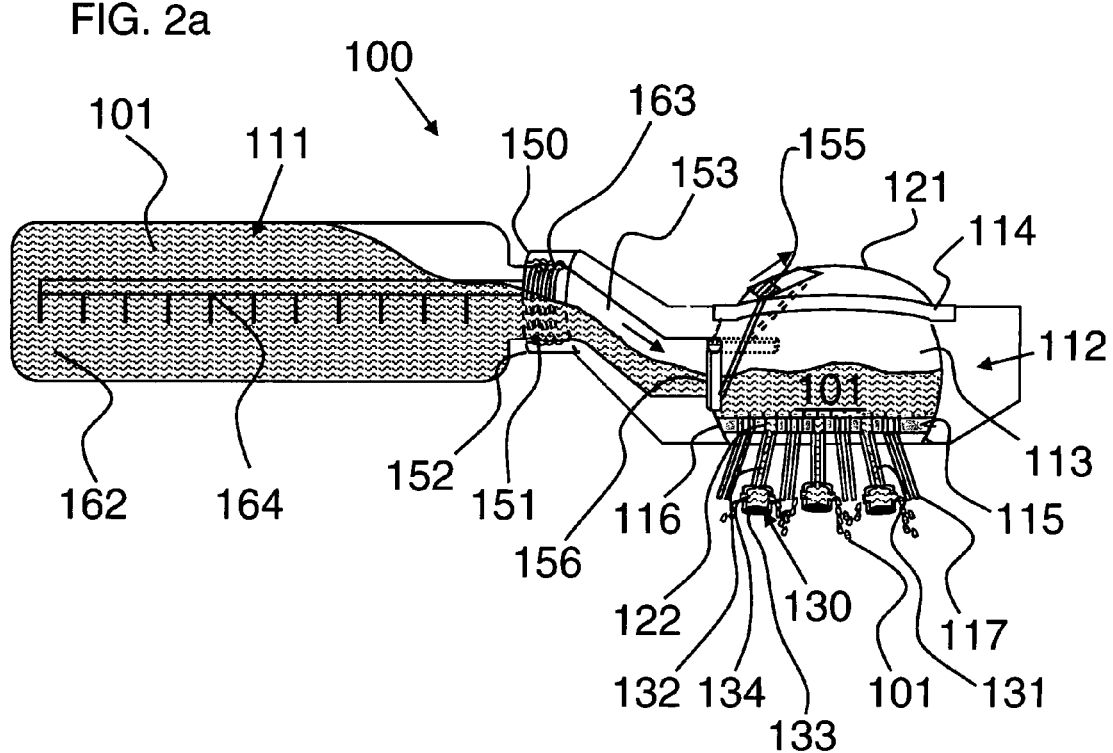
FIG. 2a is a cross section of an assembled hairbrush of the subject invention, showing the relative locations of the flexible deformable membrane with attached bristles, attached spray elements having a central spray aperture appointed for delivering active ingredients to the hair being brushed, a portion of liquid containing active ingredients transferred to the internal cavity for use, the back cover appointed with a control button, and the vessel holding active ingredients acting as a handle removably attached to the brush base.
Figure 2B:
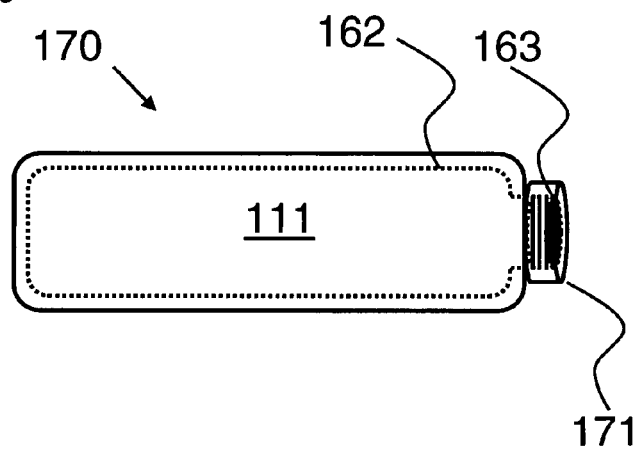
FIG. 2b is an illustration of the vessel holding active ingredients of FIG. 2a separated from the brush base and presented with a vessel lid.

FIG. 2a illustrates at 100 a cross sectional side view of an assembled hairbrush of the subject invention, shown generally at 100. FIG. 2b illustrates a view of the vessel holding active ingredients of FIG. 2a separated from the brush base and presented with a vessel lid thereon, shown generally at 170. In its assembled configuration, the flexible deformable membrane 116 is entirely contained within the first opening 115 of brush base 112. The flexible deformable membrane 116 is located against the inner wall defined by the internal cavity 113 so as to form a leak-tight seal or preferably bonded to an inner wall. Due to the larger dimension of the flexible deformable membrane 116, it protrudes from the first opening 115 with a convex bulge. The bristle elements 117 are bonded to the flexible deformable membrane 116. Flexible deformable membrane 116 includes delivery apertures 122 aligned with corresponding central spray apertures 132 of elongated hollow conical shaft 131. Herein three spray elements 130 are provided. When this brush is used, the bristle elements 117 attached to the flexible deformable membrane 116 contact the hair of the person or pet first, thereby deforming the flexible deformable membrane 116. Liquid 101 is located in contact with the flexible deformable membrane 116 and is released through spray orifices 134 of heads 133 and released onto hair being brushed. On the topside back cover 121 located at second opening 114, provided with a control button 155 configured with a flow valve 156 pivotally arranged within pathway 153 to open and close internal cavity 113 for liquid 101 transfer and storage therein for use. Cover 121 is inserted through the second opening 114 forming a leak tight seal of internal cavity 113. When the hairbrush is used, pressure is applied to the flexible deformable membrane 116 which in turn squeezes the internal cavity 113, thereby causing a liquid stream to of liquid 101 to be released from spray elements 130. The release occurs through spray elements 130, herein shown as three spray elements 130. Alternatively, the liquid 101 containing fragrance, perfume and/or other active ingredients may be released at any time by the user manually depressing the back cover 121, even when the hairbrush is not brushing hair. Alternatively, each spray element includes a sealable distortable film located in each of the delivery apertures 122 of the flexible deformable membrane 116. Each of the sealable distortable films has an ejection aperture therein.

The ejection aperture of the sealable distortable film is opened and releases the liquid into the spray element when air pressure is introduced into the internal cavity. In turn, the ejection aperture of the sealable distortable film is closed and prevents liquid from entering the spray element when air pressure is not introduced into the internal cavity. Air introduction may be achieved by way of providing a button on the top of the brush base (see for example, FIG. 10) that allows a small amount of air into the internal cavity when it is pressed and decompressed, thus opening and closing the ejection aperture.

Brush base 112 includes end 150 with connection means 151, herein shown as threads, integrated with base aperture 152 and pathway 153 leading into internal cavity 113. A vessel 111 for housing liquid 101 containing active ingredients in chamber 162 is attached to brush base 112. Vessel 111 includes an opening with a mating portion 163. Mating portion 163 is appointed for engagement with connection means 151 when attached to brush base 112 and a vessel cap 171 when not attached to brush base 112. Connection means 151 and mating portion 163 are shown as mating threads in this figure. A measurement device 164 may be included on vessel 111; herein shown as a transparent window with marked measuring.

Figure 3A:
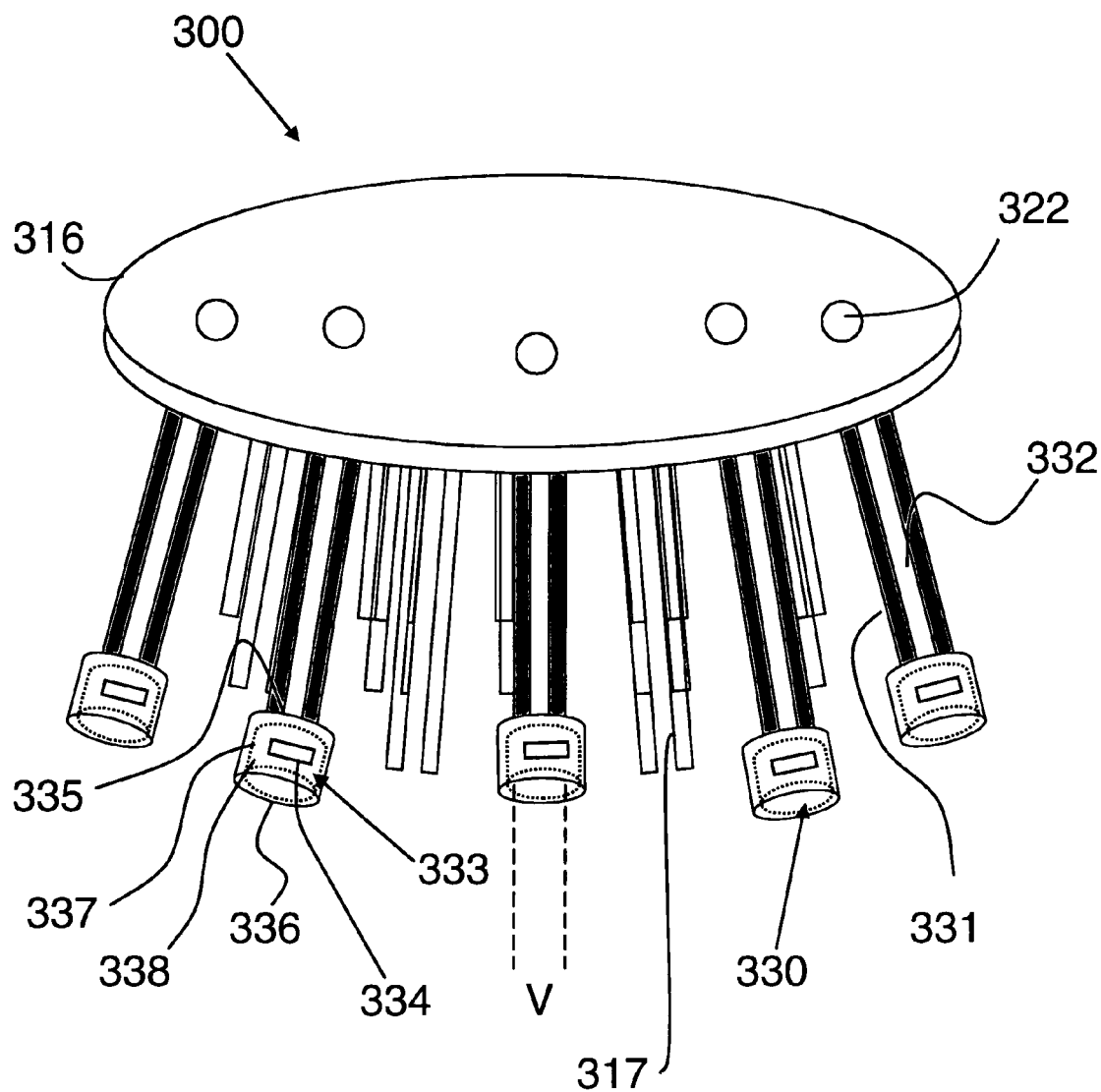
FIG. 3a is an illustration showing an embodiment of the flexible deformable membrane with attached bristles and delivery apertures aligned with attached spray elements constructed as an elongated hollow conical shaft having a head portion appointed with at least one spray orifice.
Figure 3B:
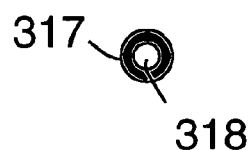
FIG. 3b shows a cross section of the elongated hollow conical shaft of an individual spray element assembly of FIG. 3a, showing the central spray aperture.

FIG. 3a illustrates at 300 the flexible deformable membrane with bonded bristles 317 attached thereto, and delivery apertures 322 constructed therein which receive spray elements' 330 elongated hollow conical shafts 331 and align with attached spray elements constructed as an elongated hollow conical shaft having a central spray aperture 332 thereof. The flexible deformable membrane 316 has delivery apertures 322 which are matched with the central spray apertures 322 in spray elements 330. In this figure, the spray elements 330 are shown in cross section to illustrate clearly the central spray aperture 332 within the elongated hollow conical shaft 331. FIG. 3b shows the cross section taken along V of the elongated hollow conical shaft 331 and central spray aperture 332 within the spray head 330. Spray element 330 comprises elongated hollow conical shaft 331 with central spray aperture 332, a head portion 333, and at least one spray orifice 334. Head portion 333 further comprises a head top 335, head bottom 336, and at least one side wall 337 to form a compartment 338. At least one spray orifice 334 is located within side wall 337 to provide lateral delivery of the liquid containing active ingredients. This lateral delivery provides efficient dissemination onto the hair as the scalp, mane, or coat is being brushed so that the liquid passes over a substantial length of the hair as it is being brushed by the brush bristles 317. Head portion 333 may comprise a plurality of spray orifices 334, such as a plurality of holes covering a substantial section of the head portion 333. In this case, the orifices would be very fine to provide controlled delivery to the hair. Herein five spray elements 330 are provided, however, a plurality of spray elements 330 may be provided; preferably, three of spray elements 330 are provided.

Figure 4A:
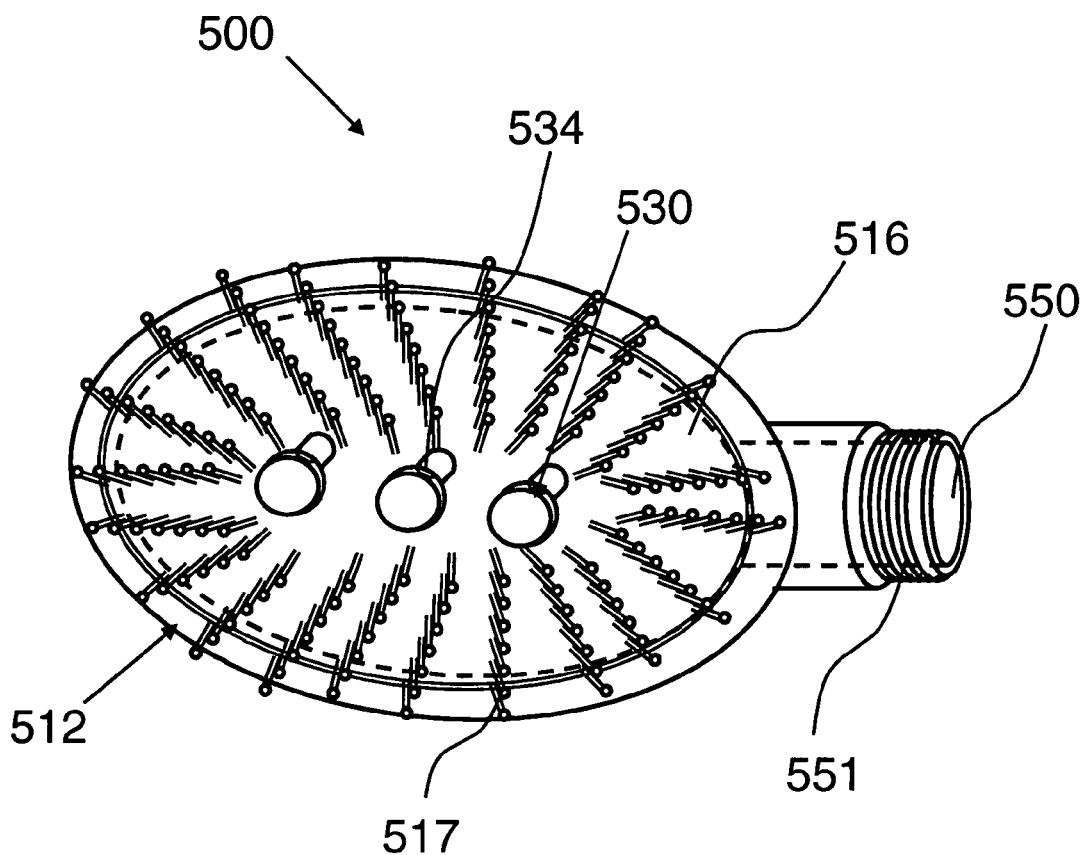
FIG. 4a is a bottom view of another image of the embodiment of the hairbrush of the subject invention generally shown in FIG. 1, showing the brush base with the flexible deformable membrane appointed with bristle elements and three spray elements, and wherein the vessel is removed from the brush base.
Figure 4B:
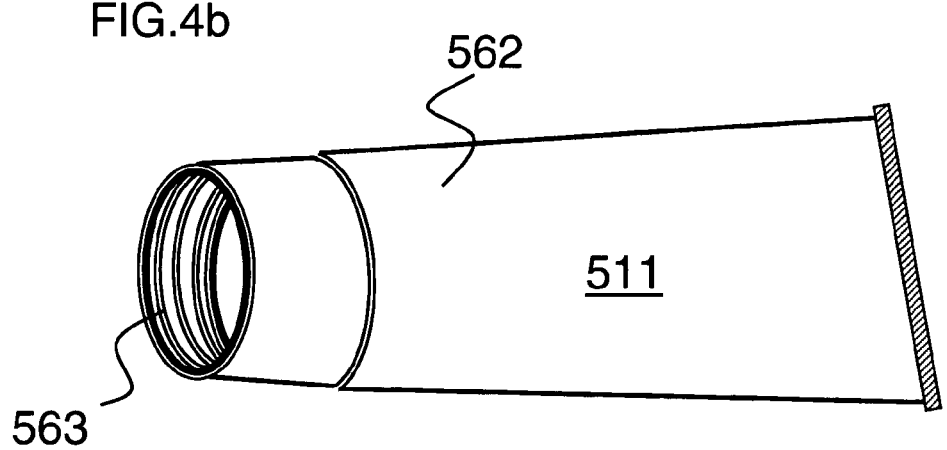
FIG. 4b is a view of the vessel holding active ingredients appointed to be attached to the brush base shown in FIG. 4a, shown as a tube structure.

FIG. 4a shows a bottom view of another embodiment of the hairbrush of the subject invention shown generally at 500; FIG. 4b shows the un-attached vessel. Brush base 512 includes the flexible deformable membrane 516 with bristle elements 517 and spray elements 530. The vessel is shown in FIG. 5b at 575, and is removed from the brush base 512. Spray elements 530 include spray orifice 534 located in head 533 for delivery of the liquid. Vessel 511 for housing liquid containing active ingredients in chamber 562 is appointed to be attached to brush base 512. Vessel 511 includes an opening with a mating portion 563. Mating portion 563 is appointed for engagement with connection means 551 of end 550 of brush base 512 when being attached to brush base 512. A vessel cap (not shown) is provided when the vessel 511 is not attached to the brush base 512.

Figure 5A:
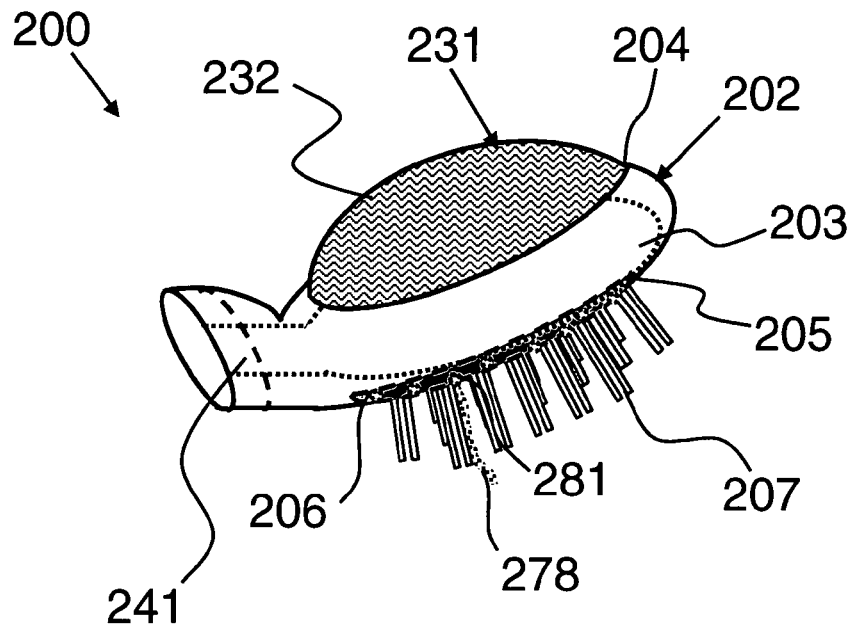
FIG. 5a is a top view of another embodiment of the hairbrush of the subject invention showing the brush base, the flexible deformable membrane with bristle elements and spray elements comprising apertures located in-between the bristle elements, back cover, and removable handle for housing the powder mixture.
Figure 5B:
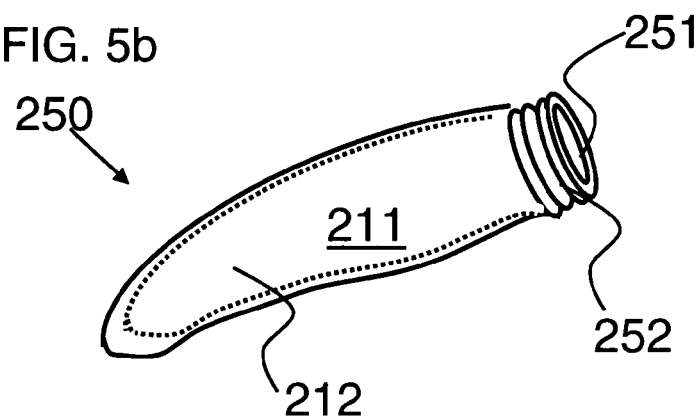
Figure 5C:
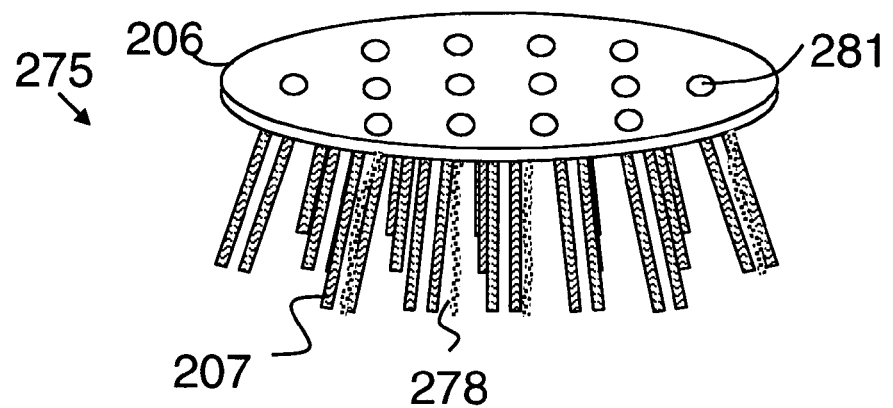
FIG. 5c is an illustration showing the flexible deformable membrane with attached bristles and a plurality of spray elements provided as apertures or holes in the flexible deformable membrane that are in close proximity to the bristles so that the composition travels out of the internal cavity through the apertures and migrates along the exterior of local bristles.

FIG. 5a is a top view of another embodiment of the hairbrush of the subject invention showing the brush base, the flexible deformable membrane with brush elements, back cover, and removable vessel for housing a powder mixture, shown generally at 200. FIG. 5b is a top view of an embodiment of the vessel, shown generally at 250. FIG. 5c is an illustration showing the flexible deformable membrane with attached bristles and a plurality of spray elements provided as apertures or holes in the flexible deformable membrane that are in close proximity to the bristles so that the composition travels out of the internal cavity through the apertures and migrates along the exterior of local bristles, shown generally at 275. Brush 200 is appointed to receive a vessel 211 removably attached to brush base 202. Brush base 202 is constructed with an internal cavity 203 having a first opening 205 and a second opening 204. Second opening 204 has a flexible deformable membrane 206 with apertures 222 and bristle elements 207. Second opening 204 is appointed to receive a back cover 231, preferably having a deformable convex portion 232 and being preferably composed of a deformable rubber. Vessel 211 is removably attached to brush base 202 and is appointed to house a composition having active ingredients appointed to be transferred to internal cavity 203 of brush base 202. Transfer of the powder mixture from vessel 211 may be achieved by simply squeezing, shaking or inverting the brush 200 (when vessel 211 is attached to brush base 202) so that the powder mixture enters the internal cavity 203 of brush base 202. Alternatively, a slidable wall may be provided interstitially within either attachment means 252 of vessel 211 or handle attachment portion 240 so that when the door is slid to an open position the powder is able to transfer to the brush base 202 and when the door is slid shut the powder remains housed within vessel 211. Flexible deformable membrane 206 is constructed with attached bristles 207 and a plurality of spray elements provided as apertures or holes 281 that are in close proximity to bristles 207 so that the composition travels 278 (herein shown as a powder) out of the internal cavity through the apertures 281 and migrates along the exterior of local bristles 207 for delivery to the hair or fur.

Figure 6A:
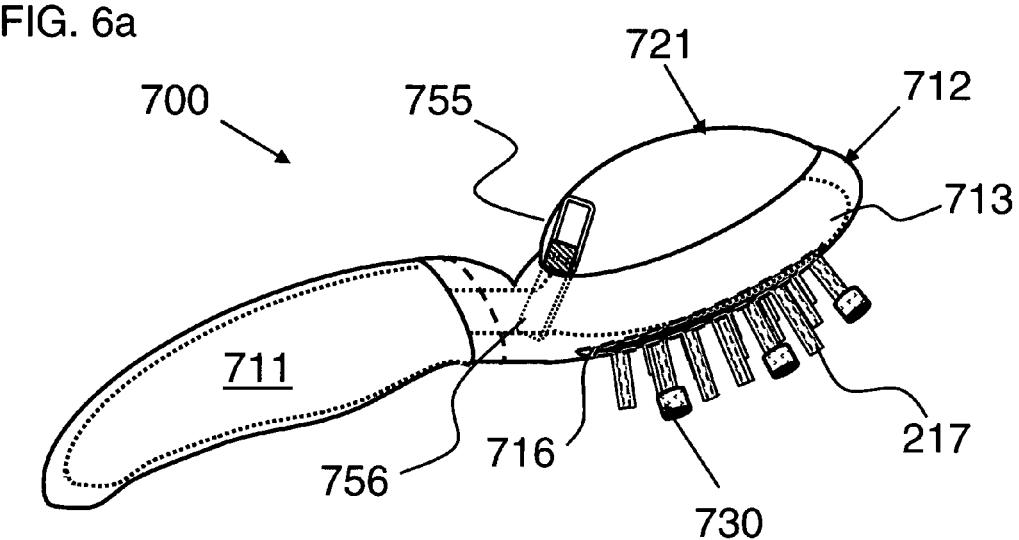
FIG. 6a is a top view of another embodiment of the hairbrush of the subject invention showing the brush base, the flexible deformable membrane, bristle elements wherein the bristle elements include central bristle apertures, spray elements having central spray apertures, and back cover with a control button assembled with the vessel holding active ingredients.
Figure 6B:
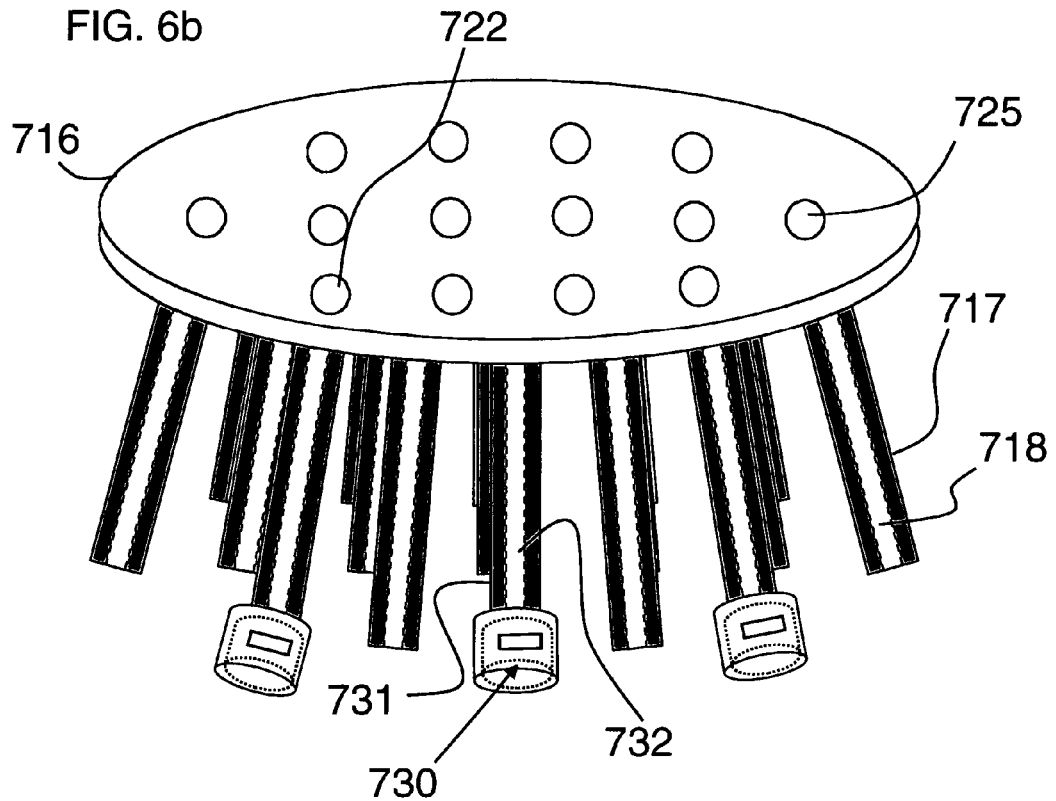
FIG. 6b is an illustration showing the flexible deformable membrane of the embodiment of FIG. 6a, with attached bristles having central bristle apertures that act in supplement to attached elongated hollow conical shaft spray elements having central spray apertures.

FIGS. 6a and 6b show another embodiment of the hairbrush of the subject invention wherein the bristle elements include bristle apertures to supplement liquid delivery of the spray elements. FIG. 6a shows the brush base, the flexible deformable membrane, brush elements wherein the brush elements include central bristle apertures, spray elements having central spray apertures, and back cover with a control button assembled, shown generally at 700. FIG. 6b is an illustration showing the flexible deformable membrane of this embodiment, with attached bristles having central bristle apertures and attached spray elements having central spray apertures. Add-on hairbrush 700 includes brush base 712 with internal cavity 713 having flexible deformable membrane 716 with apertures 725 aligned with bristle apertures 718 located in bristle elements 717. Moreover, flexible deformable member 716 includes delivery apertures 722 appointed for receiving elongated hollow conical shafts 731 of spray elements 730. Back cover 721 further comprises a control button 755 that acts in conjunction with a flow valve 756 to transfer liquid from a vessel removably attached to brush base 712.

FIG. 7 shows another embodiment of the hairbrush of the subject invention, showing a round shaft brush base 612 with a removable vessel 611 holding liquid containing active ingredients there attached for delivery of the active ingredients into the internal cavity 613 of the brush base 612. Flexible deformable member 616 is located in brush base 612 and includes bristle elements 617 and spray elements 630. Spray elements 630 include the spray orifice 654 for release onto the hair for ultimate delivery during styling.

Figure 8:
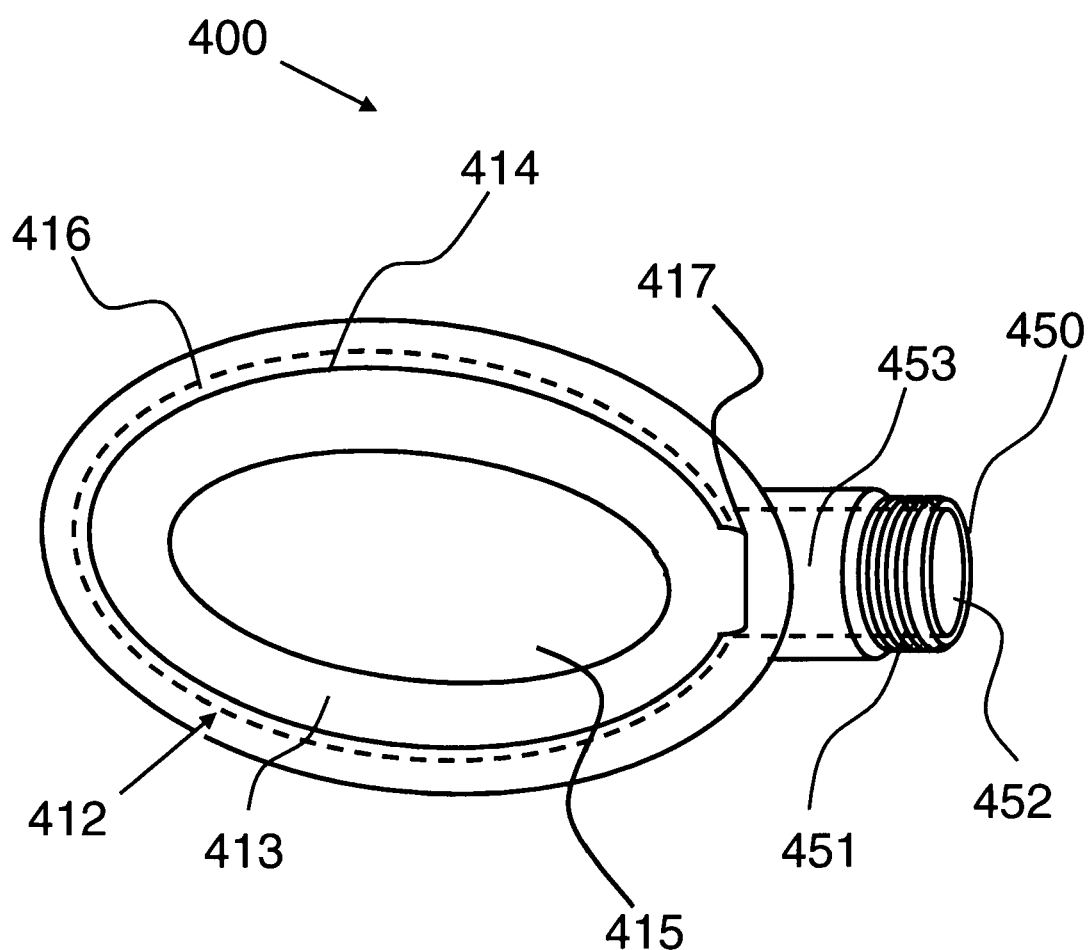
FIG. 8 is an illustration showing a brush base appointed to receive an interchangeable flexible deformable membrane constructed with attached bristles and spray elements.

Alternatively, the flexible deformable membrane is provided as an insertable or interchangeable flexible deformable membrane so that different inserts can be provided. FIG. 8 illustrates a bottom view of a brush base appointed to receive interchangeable flexible deformable membrane inserts as illustrated in FIGS. 9a-9f. In FIG. 8, brush base 412 with internal cavity 413 has a first opening 415 and second opening 414. Brush base 412 also includes an end 450 having a connection means 451 integrated with a base aperture 452 and a pathway 453 leading into internal cavity 413 within brush base 412. A vessel for housing a liquid containing active ingredients is appointed to be attached to the brush base 412. Second opening 414 preferably includes a lip 416 and an attachment tab portion 417. An insertable or interchangeable flexible deformable membrane, as shown in FIGS. 9a-9f, is appointed to be received within second opening 414 and attached by way of sliding under lip 416 and clasping by way of attachment tab portion 417. Other attachment means may be provided.

Figure 9A:
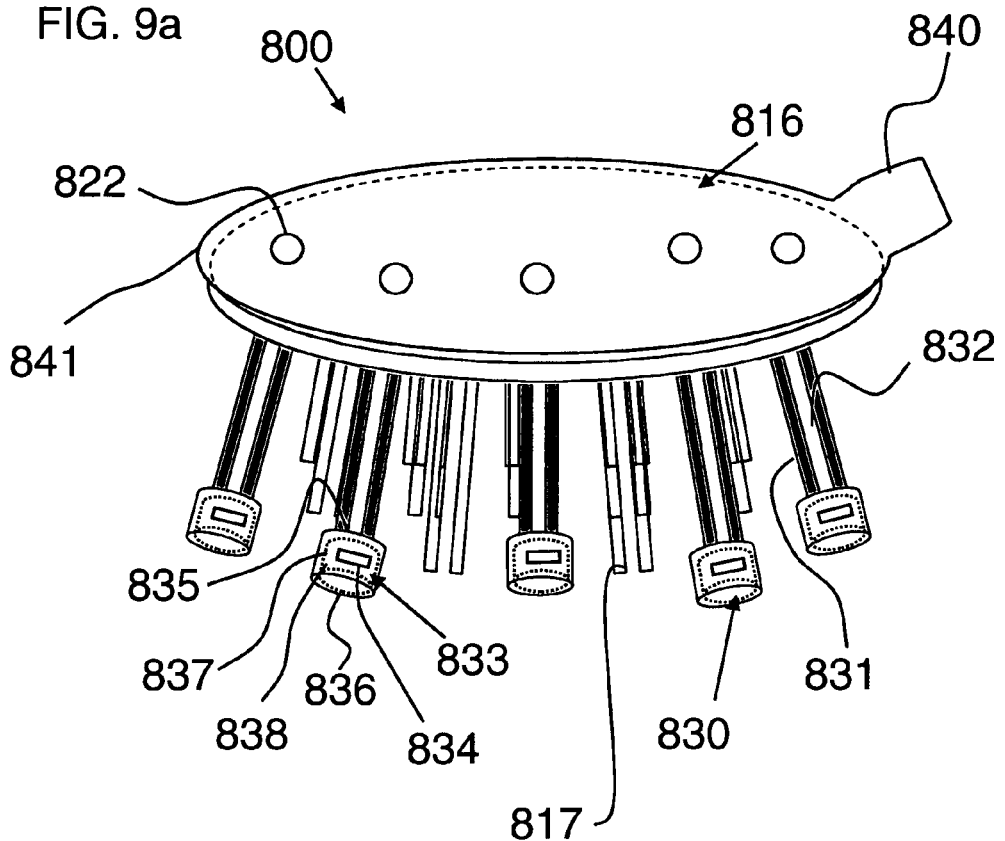
FIG. 9a is an illustration showing an interchangeable flexible deformable membrane constructed with attached bristles and spray elements having a central spray aperture similar to the first embodiment of the flexible deformable membrane generally shown in FIG. 3a, appointed to be removably attached to the brush base of FIG. 8.
Figure 9B:
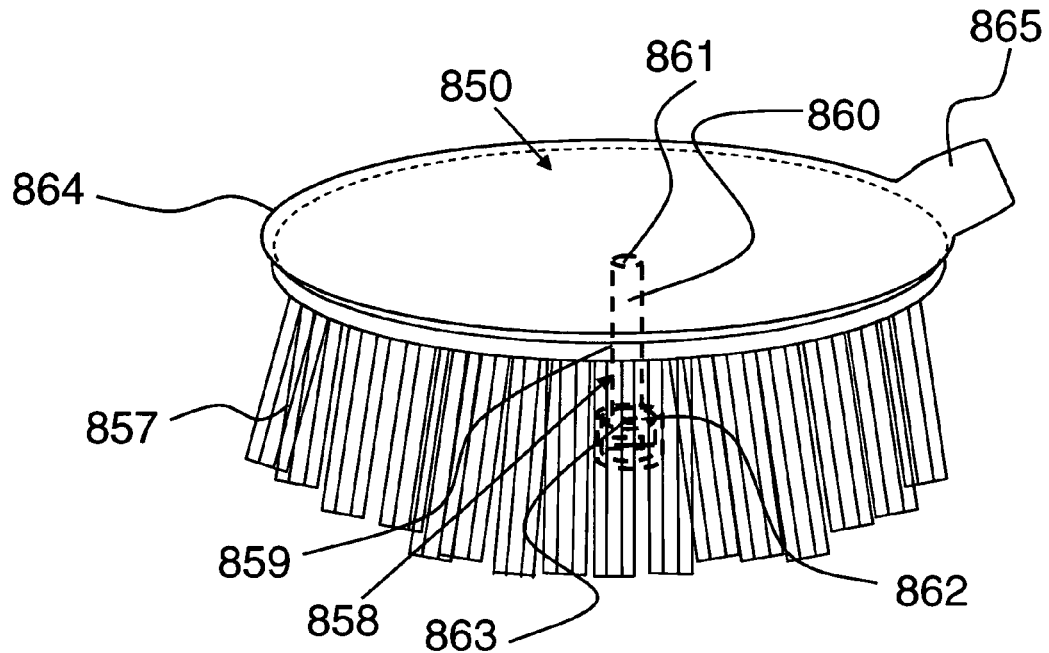
FIG. 9b is an illustration showing an interchangeable flexible deformable membrane constructed with attached bristles and a single central spray element, appointed to be removably attached to the brush base of FIG. 8.
Figure 9C:
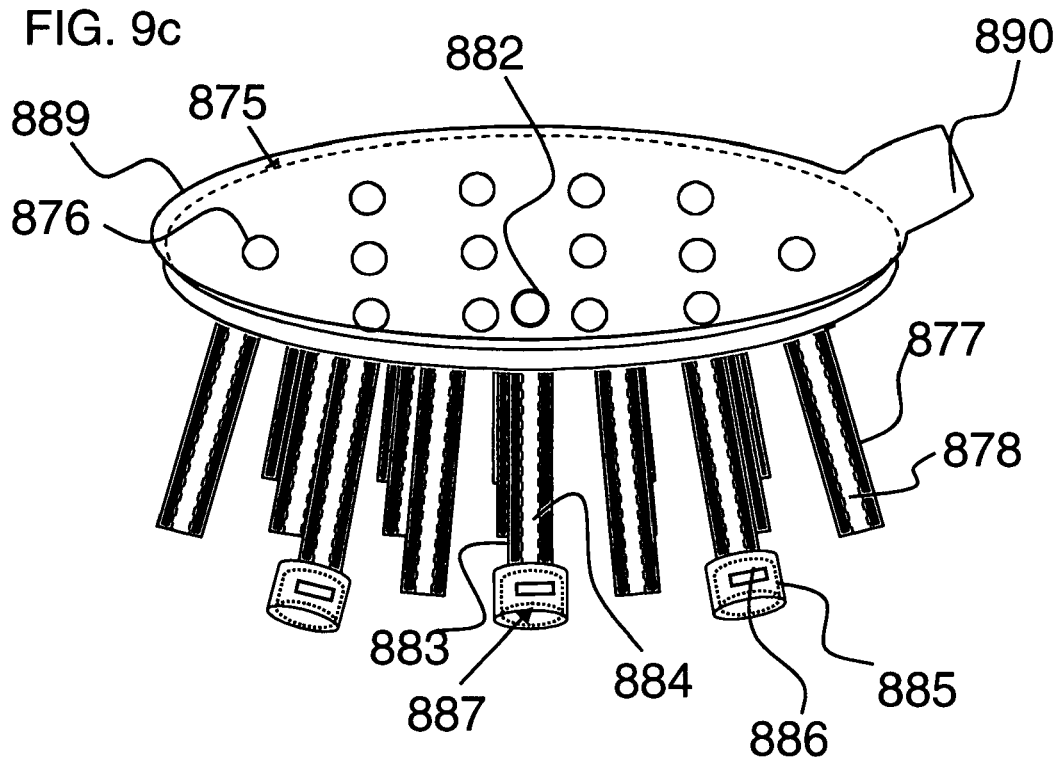
FIG. 9c is an illustration showing an interchangeable flexible deformable membrane constructed with attached bristles having central bristle apertures and elongated hollow conical shaft spray elements having central spray apertures similar to the embodiment of the flexible deformable membrane shown generally in FIG. 6b, appointed to be removably attached to the brush base of FIG. 8.

Interchangeable inserts, as shown in FIGS. 9a-9f, enable the product to be marketed with a plurality, but at least two, different inserts. One insert, for example, could be the rubber bristles with hollow channels; and the other insert, for example, could be a wire bristle brush insert with apertures in-between the wire bristles. This would enable the user to interchange the inserts/flexible deformable membranes in a given brush head during use to suit the user's needs. FIG. 9a shows an interchangeable flexible deformable membrane constructed with attached bristles and spray elements having a central spray aperture similar to the first embodiment of the flexible deformable membrane generally shown in FIG. 3a, herein shown generally at 800. Flexible deformable membrane insert 816 includes bonded bristles 817 attached thereto, and delivery apertures 822 constructed therein which receive spray elements' 830 elongated hollow conical shafts 831 and align with the central spray apertures 832 thereof. The flexible deformable membrane insert 816 has delivery apertures 822 which are matched with the central spray apertures 822 in spray elements 830. Spray element 830 comprises elongated hollow conical shaft 831 with central spray aperture 832, a head portion 833, and at least one spray orifice 834. Head portion 833 further comprises a head top 835, head bottom 836, and at least one side wall 837 to form a compartment 838. At least one spray orifice 834 is located within side wall 837 to provide lateral delivery of the liquid containing active ingredients. This lateral delivery provides efficient dissemination onto the hair as the scalp, mane, or coat is being brushed so that the liquid passes over a substantial length of the hair as it is being brushed by the brush bristles 817. Head portion 833 may comprise a plurality of spray orifices 834, such as a plurality of holes covering a substantial section of the head portion 333. In this case, the orifices would be very fine to provide controlled delivery to the hair. An overhang 841 is provided along with a tab 840 for interaction with lip 416 and clasping by way of attachment tab portion 417 of FIG. 8. FIG. 9b is an illustration showing an interchangeable flexible deformable membrane 850 constructed with attached bristles 857 and a single central spray element 858. Interchangeable flexible deformable membrane 850 is appointed to be removably attached to the brush base of FIG. 8. Herein spray element 858 is constructed with an elongated hollow conical shaft 859 with central spray aperture 860 aligned with a delivery aperture 861 of interchangeable flexible deformable membrane 850. Elongated hollow conical shaft 859 is attached to a head portion 862 having at least one spray orifice 863. An overhang 864 is provided along with a tab 865 for interaction with lip 416 and clasping by way of attachment tab portion 417 of FIG. 8. FIG. 9c is an illustration showing the flexible deformable membrane insert 875 with attached bristles having central bristle apertures and attached spray elements having central spray apertures acting together to deliver the composition to the hair or fur. Flexible deformable membrane insert 875 includes bristle apertures 876 aligned with central bristle apertures 878 located in bristle elements 877. Moreover, flexible deformable membrane insert 875 includes delivery apertures 882 appointed for receiving elongated hollow conical shafts 883 having central spray aperture 884, a head portion 885, and at least one spray orifice 886 of spray elements 887. Overhang 889 is provided along with a tab 890 for attachment to a brush base.

Figure 9D:
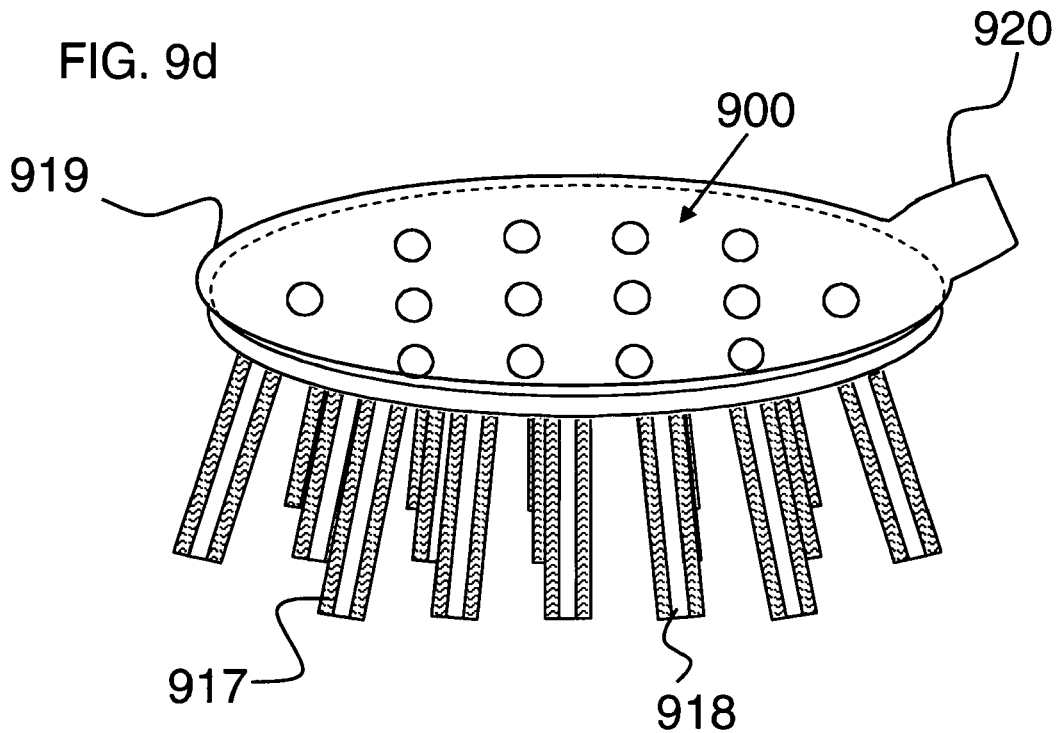
FIG. 9d is an illustration showing an interchangeable flexible deformable membrane constructed with attached bristles constructed as spray elements having central bristle apertures for delivery through the body of the bristles.
Figure 9E:
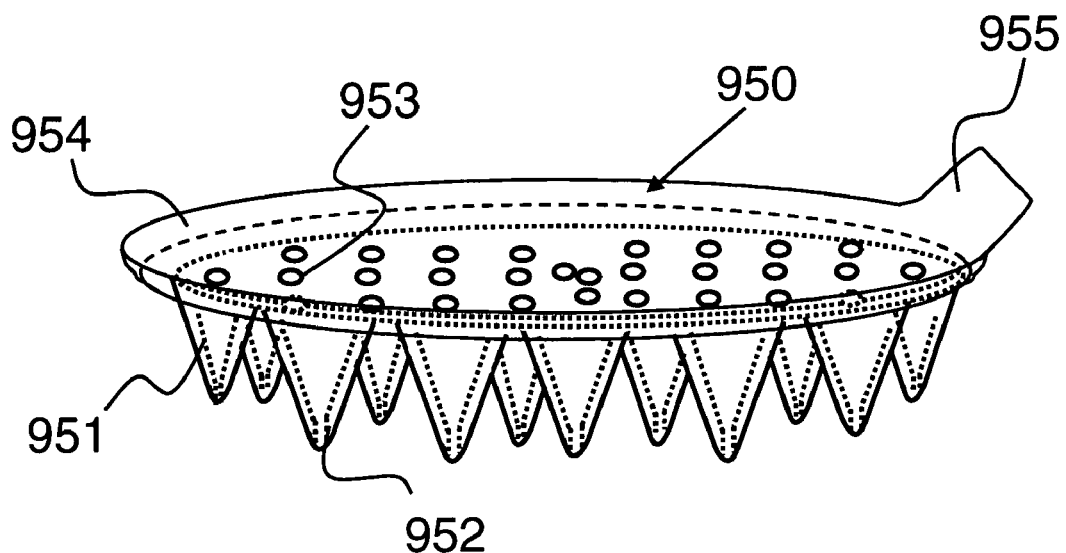
FIG. 9e is another illustration showing an interchangeable flexible deformable membrane constructed with attached bristles constructed as spray elements having central bristle apertures for delivery through the body of the bristles.

FIG. 9d shows an interchangeable flexible deformable membrane insert constructed with attached bristles constructed as spray elements having a central aperture for delivery through the body of the bristles. Flexible deformable membrane insert 900 includes bonded bristles 917 and bristle apertures 922 which are matched with central bristle apertures 918 in bristles 917. In this figure, the bristles are shown in cross section to illustrate clearly the central aperture 918. Overhang 919 is provided along with a tab 920 for attachment to a brush base as in FIG. 8. FIG. 9e is an illustration showing an interchangeable flexible deformable membrane 950 constructed with bristle apertures constructed as delivery apertures 953 for spray elements arranged interstitially within attached bristles 951 with central bristle apertures 952 for delivery to the hair or fur. Herein, bristles 951 are shown with a conical like structure. Interchangeable flexible deformable membrane 950 is appointed to be removably attached to the brush base of FIG. 8. An overhang 954 is provided along with a tab 955 for interaction with lip 416 and clasping by way of attachment tab portion 417 of FIG. 8.

Figure 9F:
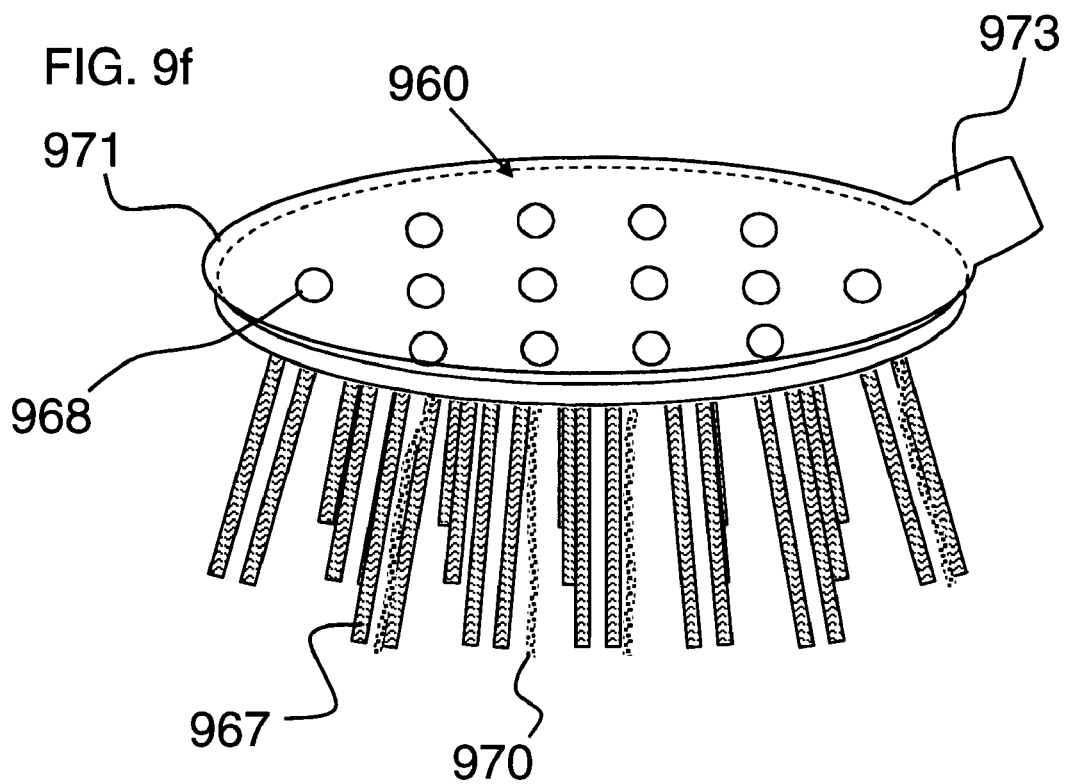
FIG. 9f is an illustration showing an interchangeable flexible deformable membrane constructed with attached bristles and a plurality of spray elements provided as apertures or holes in the flexible deformable membrane that are in close proximity to the bristles so that the composition travels out of the internal cavity of the brush base through the apertures and migrates along the exterior of local bristles.

FIG. 9f shows an interchangeable flexible deformable membrane constructed with attached bristles and a plurality of spray elements provided as apertures or holes in the flexible deformable membrane insert that are in close proximity to the bristles so that the composition travels out of the internal cavity through the apertures and migrates along the exterior of local bristles. Interchangeably flexible deformable membrane insert 960 includes bristle elements 967 constructed therein. Apertures or holes 968 act as spray elements, which are constructed in flexible deformable membrane 960. Solids or powder 970, or even a gel or liquid, travel out of the internal cavity by way of apertures 968 of the flexible deformable membrane insert 960 and migrate along the shaft exterior of bristle elements 967 for delivery to the hair or fur. Overhang 971 is provided along with a tab 972 for interaction with lip 416 and clasping by way of attachment tab portion 417 of FIG. 8.

Figure 10:
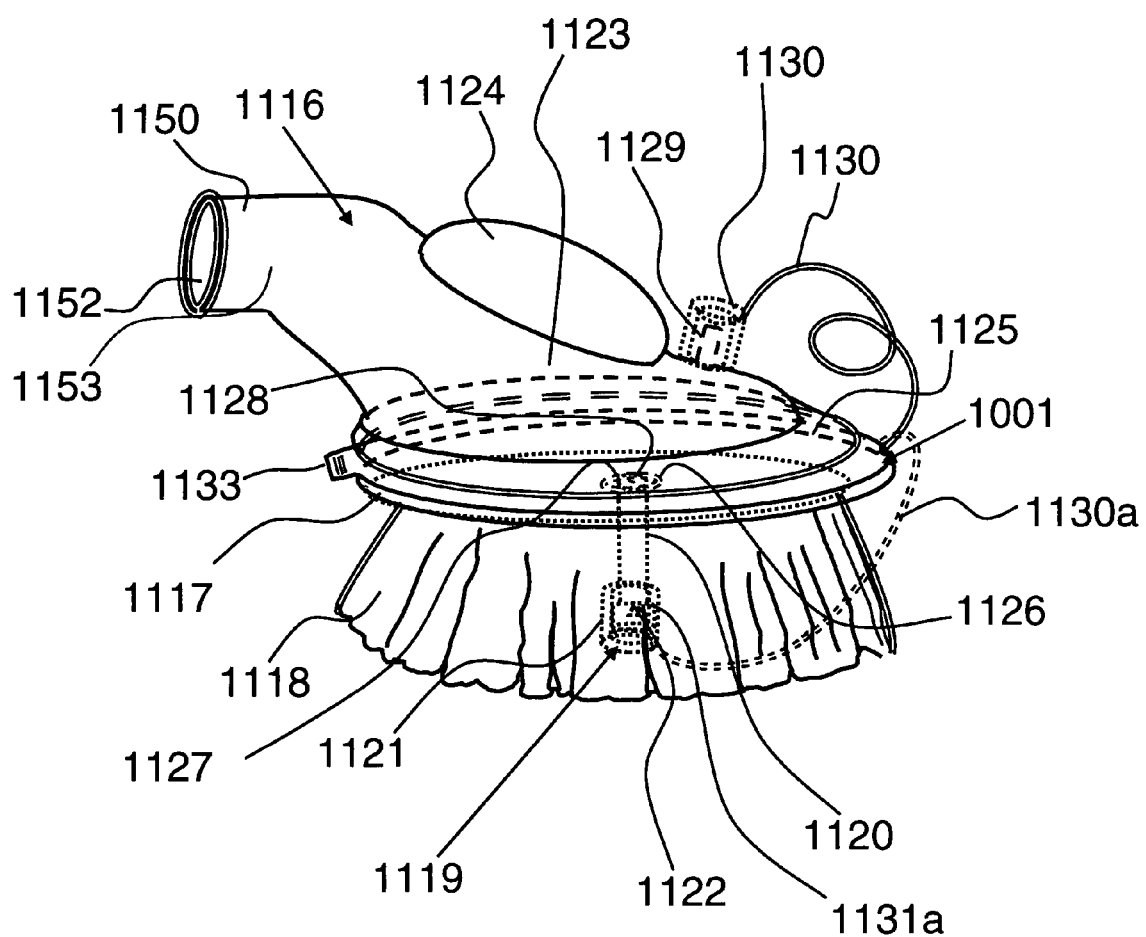
FIG. 10 is a side view of an embodiment of the hairbrush of the subject invention showing a brush base with a flexible deformable membrane containing brush elements, a central elongated hollow conical shaft spray element, a back cover with the control button, and a knob with a lanyard and cap.

FIG. 10 is a side view of an embodiment of the hairbrush of the subject invention showing a brush base 1116 with a flexible deformable membrane 1117 containing brush elements 1118 and a central elongated hollow conical shaft 1120 spray element 1119. Elongated hollow conical shaft 1120 is connected to a head portion 1121 having an orifice 1122 for delivery of a composition containing active ingredients to hair or fur. Each spray element includes a sealable distortable film 1126 located in each of the delivery apertures 1127 of the flexible deformable membrane 1116. Each of the sealable distortable films 1126 have an ejection aperture 1128 therein. The ejection aperture 1128 of the sealable distortable film 1126 is opened and releases the liquid into the spray element 1119 when air pressure is introduced into the internal cavity. A back cover 1123 is provided with a control button 1124 which herein acts to add air into the internal cavity 1125 when pressed. In turn, the ejection aperture 1128 of the sealable distortable film 1127 is closed and prevents liquid from entering the spray element 1119 when air pressure is not introduced into the internal cavity 1125. A knob 1129 with a lanyard 1130 and cap 1131 is provided. The lanyard and cap are shown covering the spray head 1119 in phantom at 1130a and 1131a, respectively. When the brush is in use, the cap 1131a is removed from the spray nozzle head/spray element 1119 and placed on the knob 1129. If it falls off the knob 1129, or is taken off the knob 1129 or spray element 1119, it is still secured thereto, and hence to the brush, by way of the lanyard 1130, thereby preventing it from becoming lost. The cap protects the spray nozzle or spray elements orifices 1122 when the brush is not in use, and also prevents liquid or powder from leaking through the spray nozzle or spray element 1119. Attachment tab 1133 is provided for attachment of the flexible deformable membrane 1116 to the brush base 1001, when the flexible deformable membrane 1116 is constructed as an insert. Brush base 1001 includes end 1150 with connection means integrated therein with a base aperture 1152 and pathway 1153 leading into internal cavity 1125. A vessel for housing liquid containing active ingredients is appointed to be attached to brush base 1001.

The hairbrushes disclosed herein can be modified in numerous ways without departing from the scope of the invention. The liquid/powder containing active ingredients can be released into central spray apertures within spray elements and/or flow along the sides of the central spray apertures upon application of pressure to flexible deformable membrane or manual depression of the back cover. An additional or reserve supply of liquid/powder can be stored in the vessel/handle which is removably attached to the brush base. Liquid/powder can be replenished in the vessel by replacing the vessel, or refilling the vessel either by removing same and pouring liquid/powder in or by providing a lid within the vessel so that liquid/powder can be poured into the vessel while still attached to the brush base. Replacement of contents within the vessel can alternatively be accomplished by insertion of injector cartridges containing the liquid/powder. Such changes, modifications and alternative arrangements of the hairbrush are well within the ambit of the present invention.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hairbrush for humans, pets and livestock, comprising:
   a. a brush base with an end having a connection means integrated with a base aperture and a pathway leading into an internal cavity within said brush base, said internal cavity having a bottom surface with a first opening, and a top surface having a second opening, said second opening being appointed with a cover;
   b. a flexible deformable membrane having bristle elements fixedly attached thereto;
   c. said first opening being adapted to receive said flexible deformable membrane;
   d. at least one spray element being integrated within said flexible deformable membrane, wherein said flexible deformable membrane includes at least one delivery aperture aligned with a central spray aperture of said spray element;
   e. a vessel housing a liquid containing active ingredients;
   f. said connection means of said end of said brush base being adapted to receive said vessel; and
   g. said vessel having an opening with a mating portion appointed for engagement with said connection means of said end of said brush base for attachment of said vessel to said brush base;
   whereby brushing hair with said hairbrush deforms said flexible deformable membrane and squeezes said internal cavity, releasing said liquid through said delivery aperture in said flexible deformable membrane and into said central spray apertures of said spray element for delivery into said hair; and
   whereby pressing said cover squeezes said internal, releasing said liquid through said delivery aperture in said flexible deformable membrane and into said central spray apertures of said spray element for delivery into said hair even when said bristles of said brush are not in contact with hair.

2. A hairbrush as recited by claim 1, wherein each of said first and second openings is elliptical, said flexible deformable membrane is elliptical, and said cover is elliptical.

3. A hairbrush as recited by claim 1, wherein each of said first and second openings is circular, said flexible deformable membrane is circular, and said cover is circular.

4. A hairbrush as recited by claim 1, wherein each of said first and second openings is rectangular, said flexible deformable membrane is rectangular, and said cover is rectangular.

5. A hairbrush as recited by claim 1, wherein each of said first and second openings is square-shaped, said flexible deformable membrane is square-shaped, and said cover is square-shaped.

6. A hairbrush as recited by claim 1, wherein said flexible deformable membrane is composed of rubber having a thickness in the range of $1/32$ inch to $3/32$ inch.

7. A hairbrush as recited by claim 1, wherein said flexible deformable membrane delivery aperture has a diameter in the range of 0.010 inch to 0.060 inch.

8. A hairbrush as recited by claim 1, wherein each of said central spray aperture of said spray element has a circular cross section having a diameter ranging from 0.01 to 0.060 inch.

9. A hairbrush as recited by claim 1, wherein said spray element comprises an elongated hollow conical shaft, a head portion, and at least one spray orifice, wherein said central spray aperture is located within said elongated hollow conical shaft.

10. A hairbrush as recited by claim 9, wherein said head portion further comprises a head top, head bottom, and at least one side wall, and said at least one spray orifice is located within said side wall to provide lateral delivery of said liquid.

11. A hairbrush as recited by claim 9, wherein said head portion comprises a plurality of spray orifices.

12. A hairbrush as recited by claim 9, wherein said bristle elements include central bristle apertures that align with bristle apertures located in said flexible deformable membrane for delivery of said liquid supplemental to said elongated hollow conical shaft spray element.

13. A hairbrush as recited by claim 1 having a plurality of spray elements.

14. A hairbrush as recited by claim 1 having three spray elements.

15. A hairbrush as recited by claim 1, wherein said liquid consists of active ingredients selected from a group consisting of insect repellants, flea and/or tic compounds, therapeutic or moisturizing compounds, or antibacterial compounds.

16. A hairbrush as recited by claim 1, wherein said liquid consists of active ingredients selected from a group consisting of perfumes, fragrance, hair-conditioning and detangle products, shampoos, medicaments, hair sprays, gels, mousse products, sun protection lotions, dye compositions, fragrances or other hair/fur/coat-care related products.

17. A hairbrush as recited by claim 1, wherein said connection means of said brush base comprises base threads and said mating portion of said vessel comprises vessel threads, wherein said base threads and said vessel threads screw together to removably attach said vessel to said brush base.

18. A hairbrush as recited by claim 1, wherein said connection means of said brush base comprises a female connector member and said mating portion of said vessel comprises a male connector member, wherein said female connector member receives said male connector member in a snap configuration to removably attach said vessel to said brush base.

19. A hairbrush as recited by claim 1, wherein said vessel for housing said liquid containing active ingredients is constructed as a tube, bottle, or otherwise elongated structure, and is removable from said brush base, and wherein said vessel is provided with a vessel cap to be utilized when said vessel is not attached to said brush base.

20. A hairbrush as recited by claim 1, wherein said vessel for housing said liquid containing active ingredients is constructed as a removable handle portion, said handle portion appointed to receive a handle cap when said handle portion is removed from said brush base.

21. A hairbrush as recited by claim 1, wherein said vessel housing said liquid containing active ingredients is disposable.

22. A hairbrush as recited by claim 20, wherein replacement vessels housing said liquid containing active ingredients are provided to replace said disposed vessels.

23. A hairbrush as recited by claim 1, wherein said vessel housing said liquid containing active ingredients is squeezable so that said liquid is transferred from said vessel to said internal cavity when said vessel is squeezed.

24. A hairbrush as recited by claim 1, wherein said vessel for housing said liquid containing active ingredients is constructed as an attached vessel handle, said attached vessel handle portion further comprising an opening having a lid, said opening being appointed to refill said attached vessel handle when refill of said liquid is desired.

25. A hairbrush as recited by claim 1, wherein said vessel for housing said liquid containing active ingredients is constructed as a container having a hose, said mating portion of said vessel being attached to said hose so that said hose can be removably attached to said connection means of said brush base.

26. A hairbrush as recited by claim 1, wherein said cover further comprises a control button that acts in conjunction with a flow valve to allow said liquid from said vessel to enter said pathway of said internal cavity and become transferred and housed within said internal cavity of said brush.

27. A hairbrush as recited by claim 1, wherein said cover further comprises a pump lever operating in conjunction with a thin tube that connects directly to a spray nozzle connected to said spray element so that said liquid flows through said tube into said spray nozzle and is delivered by ejection therefrom into said spray element and is sprayed into said hair.

28. A hairbrush as recited by claim 1, wherein said spray elements comprise central bristle apertures located within each of said bristle elements, wherein said flexible deformable membrane includes bristle apertures that align with said apertures of said bristle elements for delivery of said liquid through said bristle elements.

29. A hairbrush as recited by claim 1, wherein each of said spray element includes a sealable distortable film having an ejection aperture therein, wherein said ejection aperture of said sealable distortable film is opened and releases said liquid into said spray element when air pressure is introduced into said internal cavity, and wherein said ejection aperture of said sealable distortable film is closed and prevents liquid from entering said spray element when air pressure is not introduced into said internal cavity.

30. A hairbrush as recited by claim 1, wherein said liquid containing active ingredients is supplied through a hose, said connection means of said brush base having a mating portion appointed to be attached to said hose so that said hose can be removably attached to said connection means of said brush base and supply of fluid through said hose to said brush base is continuous.

31. A hairbrush as recited by claim 1 comprising a knob connected by a lanyard to a cap adapted to fit over said spray element.

32. A hairbrush for humans, pets and livestock, comprising:
  a. a brush base with an end having a connection means integrated with a base aperture and a pathway leading into an internal cavity within said brush base, said internal cavity having a bottom surface with a first opening, and a top surface having a second opening, said second opening being appointed with a cover;
  b. an interchangeable flexible deformable membrane having bristle elements fixedly attached thereto and at least one spray element having a central spray aperture being integrated within said flexible deformable membrane;
  c. said first opening being adapted to receive said interchangeable flexible deformable membrane;
  d. a vessel housing a composition containing active ingredients; and
  e. said connection means of said end of said brush base being adapted to receive said vessel; and
  f. said vessel having an opening with a mating portion appointed for engagement with said connection means for attachment of said vessel to said brush base and transference of said composition containing active ingredients to said internal cavity of said brush base;
  whereby brushing hair with said hairbrush deforms said flexible deformable membrane and squeezes said internal cavity, releasing said composition containing active ingredients through said spray element in said interchangeable flexible deformable membrane into said central spray aperture for delivery into said hair; and
  whereby pressing said cover squeezes said internal cavity, releasing said composition containing active ingredients through said spray element in said interchangeable flexible deformable membrane into said central spray aperture for delivery into said hair even when said bristles of said brush are not in contact with hair.

33. A hairbrush as recited by claim 32, wherein said spray element of said interchangeable flexible membrane comprises an elongated hollow conical shaft, a head portion, and at least one spray orifice, wherein said central spray aperture is located within said elongated hollow conical shaft.

34. A hairbrush as recited by claim 33, wherein said head portion further comprises a head top, head bottom, and at least one side wall, and said at least one spray orifice is located within said side wall to provide lateral delivery of said liquid.

35. A hairbrush as recited by claim 33, wherein said head portion comprises a plurality of spray orifices.

36. A hairbrush as recited by claim 33, wherein said bristle elements include apertures that align with bristle apertures located in said flexible deformable membrane for delivery of said liquid supplemental to said elongated hollow conical shaft spray element.

37. A hairbrush as recited by claim 32 having a plurality of said spray elements.

38. A hairbrush as recited by claim 32, wherein said spray elements of said interchangeable flexible membrane comprises apertures located within each of said bristle elements, wherein said flexible deformable membrane includes bristle apertures that align with said apertures of said bristle elements for delivery of said liquid through said bristle elements.

39. A hairbrush as recited by claim 32, wherein said spray elements of said interchangeable flexible membrane comprises a plurality of apertures located in-between said bristles.

40. A hairbrush as recited by claim 32, wherein said vessel for housing said liquid containing active ingredients is constructed as a tube, bottle, or otherwise elongated structure, and is removable from said brush base, and wherein said vessel is provided with a vessel cap to be utilized when said vessel is not attached to said brush base.

41. A hairbrush as recited by claim 32, wherein said vessel for housing said liquid containing active ingredients is constructed as a removable handle portion, said handle portion appointed to receive a handle cap when said handle portion is removed from said brush base.

42. A hairbrush as recited by claim 32, wherein said vessel housing said liquid containing active ingredients is squeezable so that said liquid is transferred from said vessel to said internal cavity when said vessel is squeezed.

43. A hairbrush as recited by claim 32, wherein said cover further comprises a pump lever operating in conjunction with a thin tube that connects directly to a spray nozzle so that said liquid flows through said tube into said spray nozzle and is delivered by ejection therefrom into said internal cavity.

44. A hairbrush as recited by claim 32 comprising a knob connected by a lanyard to a cap adapted to fit over said spray element.

45. A hairbrush as recited by claim 32, wherein each of said spray element includes a sealable distortable film having an ejection aperture therein, wherein said ejection aperture of said sealable distortable film is opened and releases said liquid into said spray element when air pressure is introduced into said internal cavity, and wherein said ejection aperture of said sealable distortable film is closed and prevents liquid from entering said spray element when air pressure is not introduced into said internal cavity.

46. A method for making a hairbrush for humans and pets that releases a composition containing active ingredients directly to hair or fur, comprising the steps of:
   a. forming a brush base having an end appointed with a connection means integrated with a base aperture and a pathway leading into an internal cavity within said brush base, said internal cavity having a bottom surface with a first opening and top surface having a second opening;
   b. producing a flexible deformable membrane having bristle apertures with bristles rigidly attached thereto;
   c. forming at least one head aperture within said flexible deformable membrane;
   d. inserting at least one spray element in said delivery aperture of said flexible deformable membrane, said spray element having a central spray aperture being aligned with said delivery aperture of said flexible deformable membrane;
   e. inserting said flexible deformable membrane into said first opening in said internal cavity;
   f. forming a vessel having an opening with a mating portion appointed for attachment to said connection means of said end of said brush base;
   g. filling said vessel with said composition containing active ingredients;
   h. attaching a cover into said second opening in said internal cavity, said cover having a control mechanism that acts in conjunction with a flow valve to allow said composition from said vessel to enter said pathway of said internal cavity and become transferred and housed within said internal cavity of said brush for delivery during brushing;
   whereby said flexible deformable membrane and cover create a leak-tight seal for said internal cavity in said brush base, and brushing hair or manually depressing said cover releases said liquid containing active ingredients to hair through said spray element.

* * * * *